(12) United States Patent
Sringfellow et al.

(10) Patent No.: US 8,567,450 B2
(45) Date of Patent: *Oct. 29, 2013

(54) METHODS AND SYSTEMS FOR IN SITU MANUFACTURE AND INSTALLATION OF NON-METALLIC HIGH PRESSURE PIPE AND PIPE LINERS

(75) Inventors: William D. Sringfellow, Houston, TX (US); Kyle Bethel, Houston, TX (US); Aron Eklund, Houston, TX (US); Stephen C. Catha, Houston, TX (US); Kenneth R. Charboneau, Slidell, LA (US)

(73) Assignee: Smart Pipe Company LP, Katy, TX (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/455,582

(22) Filed: Jun. 3, 2009

(65) Prior Publication Data

US 2009/0308475 A1    Dec. 17, 2009

Related U.S. Application Data

(63) Continuation-in-part of application No. 11/033,962, filed on Jan. 12, 2005, now abandoned, and a continuation-in-part of application No. 12/317,376, filed on Dec. 22, 2008.

(51) Int. Cl.
*F16L 55/16* (2006.01)

(52) U.S. Cl.
USPC ............. 138/98; 138/104; 138/112; 138/120; 138/125; 138/130; 404/150.1; 404/184.2

(58) Field of Classification Search
USPC ......... 138/98, 130, 125, 112, 104; 405/150.4, 405/184.2, 150.1
See application file for complete search history.

(56) References Cited

U.S. PATENT DOCUMENTS

| 1,722,764 A | 7/1929 | Rasch ........................... 442/240 |
| 2,424,315 A | 7/1947 | Hyatt et al. ................... 138/128 |

(Continued)

FOREIGN PATENT DOCUMENTS

| DE | 2.442.449 | 3/1976 |
| DE | 4.427.633 | 2/1995 |
| EP | 0 231 154 | 8/1987 |

OTHER PUBLICATIONS

PCT/GB2005/050204: Int'l Search Report: 5 pp.: mailed Apr. 6, 2006.

(Continued)

*Primary Examiner* — James Hook
(74) *Attorney, Agent, or Firm* — Guy McClung

(57) ABSTRACT

Pipe with a liner or core pipe and a liner or core pipe which is insertable into a host pipe, the liner or core pipe including, in certain aspects, a pipe made of temperature-resistant non-metallic corrosion-resistant material; first and second strengthening wraps around the pipe; a plurality of spaced-apart axial strength members or pulling tapes on the pipe; and a protective outer wrap on the pipe. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

23 Claims, 17 Drawing Sheets

(56) References Cited

U.S. PATENT DOCUMENTS

| | | | |
|---|---|---|---|
| 2,502,638 A | 4/1950 | Becht | |
| 3,099,190 A | 7/1963 | Allen, Jr. et al. | 93/80 |
| 3,177,902 A * | 4/1965 | Rubenstein | 138/176 |
| 3,253,618 A | 5/1966 | Cook | 138/125 |
| 3,500,869 A | 3/1970 | Skoggard et al. | 138/130 |
| 3,599,233 A * | 8/1971 | Meyer | 703/9 |
| 3,616,072 A | 10/1971 | Bostrom | 156/468 |
| 3,779,308 A | 12/1973 | Buhrmann et al. | 165/51 |
| 3,799,825 A | 3/1974 | Champleboux et al. | 156/144 |
| 3,823,590 A | 7/1974 | Lang | 72/66 |
| 3,905,398 A | 9/1975 | Johansen et al. | 138/124 |
| 4,009,063 A | 2/1977 | Wood | 156/71 |
| 4,029,428 A | 6/1977 | Levens | 408/127 |
| 4,120,324 A | 10/1978 | Pahl | 138/137 |
| 4,123,928 A | 11/1978 | Ferrentino | 72/66 |
| 4,135,958 A | 1/1979 | Wood | 156/199 |
| 4,142,352 A | 3/1979 | Greczin | 57/15 |
| 4,207,130 A | 6/1980 | Barber | 156/244.13 |
| 4,351,349 A | 9/1982 | Minotti | 137/15 |
| 4,366,012 A | 12/1982 | Wood | 156/93 |
| 4,384,595 A | 5/1983 | Washkewicz et al. | 138/127 |
| 4,390,574 A | 6/1983 | Wood | 428/36 |
| 4,446,181 A | 5/1984 | Wood | 428/36.1 |
| 4,478,661 A | 10/1984 | Lewis | 156/92 |
| 4,495,018 A | 1/1985 | Vohrer | 156/187 |
| 4,576,205 A | 3/1986 | Morinaga et al. | 138/98 |
| 4,622,196 A | 11/1986 | Wood | 264/229 |
| 4,756,339 A | 7/1988 | Buluschek | 138/115 |
| 4,777,984 A | 10/1988 | Storah | 138/98 |
| 4,836,715 A | 6/1989 | Wood | 405/150.1 |
| 4,838,477 A | 6/1989 | Roach et al. | 228/222 |
| 4,851,274 A | 7/1989 | D'Elia | 428/113 |
| 4,976,290 A | 12/1990 | Gelin et al. | 138/141 |
| 4,985,196 A * | 1/1991 | LeDoux et al. | 264/516 |
| 5,010,440 A | 4/1991 | Endo | 361/215 |
| 5,035,539 A | 7/1991 | Kawafuji et al. | 405/184.2 |
| 5,049,006 A | 9/1991 | Payne | 405/270 |
| 5,072,622 A | 12/1991 | Roach et al. | 73/40.5 R |
| 5,077,107 A | 12/1991 | Kaneda et al. | 146/36.1 |
| 5,152,323 A * | 10/1992 | Shotts et al. | 138/151 |
| 5,186,987 A | 2/1993 | Imoto et al. | 428/34.5 |
| 5,225,021 A | 7/1993 | Lona | 156/190 |
| 5,271,433 A | 12/1993 | Schwert et al. | 138/98 |
| 5,395,472 A | 3/1995 | Mandich | 145/287 |
| 5,397,513 A * | 3/1995 | Steketee, Jr. | 264/36.17 |
| 5,399,854 A | 3/1995 | Dunphy et al. | 250/227.17 |
| 5,497,809 A | 3/1996 | Wolf | 138/113 |
| 5,501,248 A | 3/1996 | Kiest, Jr. | 138/98 |
| 5,503,695 A * | 4/1996 | Imoto et al. | 156/71 |
| 5,546,992 A | 8/1996 | Chick et al. | 138/98 |
| 5,551,484 A | 9/1996 | Charboneau | 138/104 |
| 5,632,952 A | 5/1997 | Mandich | 264/516 |
| 5,634,743 A | 6/1997 | Chandler | 405/150.1 |
| 5,680,885 A | 10/1997 | Catallo | 138/98 |
| 5,712,010 A | 1/1998 | Russek et al. | 428/36.3 |
| 5,762,450 A | 6/1998 | Schmager | 405/154 |
| 5,778,938 A * | 7/1998 | Chick et al. | 138/98 |
| 5,865,216 A | 2/1999 | Youngs | 138/135 |
| 5,868,169 A | 2/1999 | Catallo | 138/98 |
| 5,921,285 A | 7/1999 | Quigley et al. | 138/125 |
| 5,931,199 A | 8/1999 | Kittson et al. | 138/98 |
| 5,933,945 A | 8/1999 | Thomeer et al. | 29/825 |
| 5,934,332 A * | 8/1999 | Rodriguez et al. | 138/98 |
| 6,004,639 A | 12/1999 | Quigley et al. | 428/36.3 |
| 6,058,978 A | 5/2000 | Paletta et al. | 138/98 |
| 6,098,665 A | 8/2000 | Grace | 138/98 |
| 6,117,507 A * | 9/2000 | Smith | 428/36.9 |
| 6,123,110 A | 9/2000 | Smith et al. | 138/98 |
| 6,170,531 B1 | 1/2001 | Jung et al. | 138/98 |
| 6,220,079 B1 | 4/2001 | Taylor et al. | 73/37 |
| 6,302,152 B1 | 10/2001 | Mulligan | 138/125 |
| 6,311,730 B2 * | 11/2001 | Penza | 138/98 |
| 6,357,485 B2 | 3/2002 | Quigley et al. | 138/125 |
| 6,446,672 B1 | 9/2002 | Kalman | 138/127 |
| 6,455,115 B1 | 9/2002 | DeMeyer | 426/36.2 |
| 6,572,306 B2 | 6/2003 | Prusak | 405/183.5 |
| 6,601,600 B1 | 8/2003 | Taylor | 137/15.04 |
| 6,619,886 B1 | 9/2003 | Harrington | 405/184.2 |
| 6,627,281 B2 | 9/2003 | DeMeyer | 428/36.1 |
| 6,634,388 B1 | 10/2003 | Taylor et al. | 138/114 |
| 6,663,808 B2 | 12/2003 | DeMeyer | 264/171.26 |
| 6,670,880 B1 | 12/2003 | Hall et al. | 336/132 |
| 6,691,741 B2 | 2/2004 | Manners | 138/98 |
| 6,708,729 B1 | 3/2004 | Smith | 138/98 |
| 6,759,968 B2 | 7/2004 | Zierolf | 340/854.8 |
| 6,769,454 B2 | 8/2004 | Fraser et al. | 138/127 |
| 6,782,932 B1 | 8/2004 | Reynolds, Jr. et al. | 156/351 |
| 6,785,004 B2 | 8/2004 | Kersey et al. | 356/478 |
| 6,824,689 B2 | 11/2004 | Wang et al. | 210/660 |
| 6,935,376 B1 * | 8/2005 | Taylor et al. | 138/98 |
| 6,945,279 B2 | 9/2005 | Baba et al. | 138/137 |
| 6,960,313 B2 | 11/2005 | Waring et al. | 264/36.17 |
| 7,025,580 B2 | 4/2006 | Heagy et al. | 425/11 |
| 7,216,674 B2 | 5/2007 | Manners | 138/98 |
| 7,258,141 B2 * | 8/2007 | Catha et al. | 138/98 |
| 7,824,595 B2 | 11/2010 | Appleby et al. | 264/316 |
| 2002/0124898 A1 | 9/2002 | Renaud et al. | 138/98 |
| 2002/0189749 A1 | 12/2002 | Shieh | 156/172 |
| 2003/0051795 A1 | 3/2003 | Burgess | 156/169 |
| 2003/0206989 A1 | 11/2003 | DeMeyer | 425/392 |
| 2004/0025951 A1 | 2/2004 | Baron et al. | 138/98 |
| 2004/0144440 A1 | 7/2004 | Lundberg et al. | 138/130 |
| 2006/0124188 A1 * | 6/2006 | Catha et al. | 138/98 |
| 2008/0281534 A1 * | 11/2008 | Hurley | 702/47 |
| 2009/0294567 A1 | 12/2009 | Witmer et al. | 242/419 |

OTHER PUBLICATIONS

PCT/GB2005/050204: Written Opinion of the Int'l Searching Authority: 9 pp.: mailed Apr. 6, 2006.

Plastic Pipe: Expect Better Materials: Stidger: Gas Utility Manager: Dec. 2003; pp. 38. 39.

What Does A Pipeline Incident Really Cost ?: Selig et al: Gas Utility Manager: Dec. 2003: pp. 40-45.

Leakage Detection Using Fiber Optics Distributed Temperature Monitoring: Nikles et al: SPIE: Mar. 2004: 8 pp.

Health Monitoring Of A Pipeline Based On Distributed Strain And Temperature Measurements: Glistic et al: SMARTEC SA: 2003: 9 pp.

Tiny tubes loom large: Roper: Houston Chronicle: Mar. 6, 2005: 3 pp.

* cited by examiner

Fig. 20
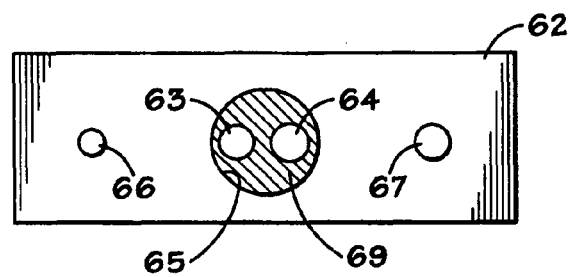
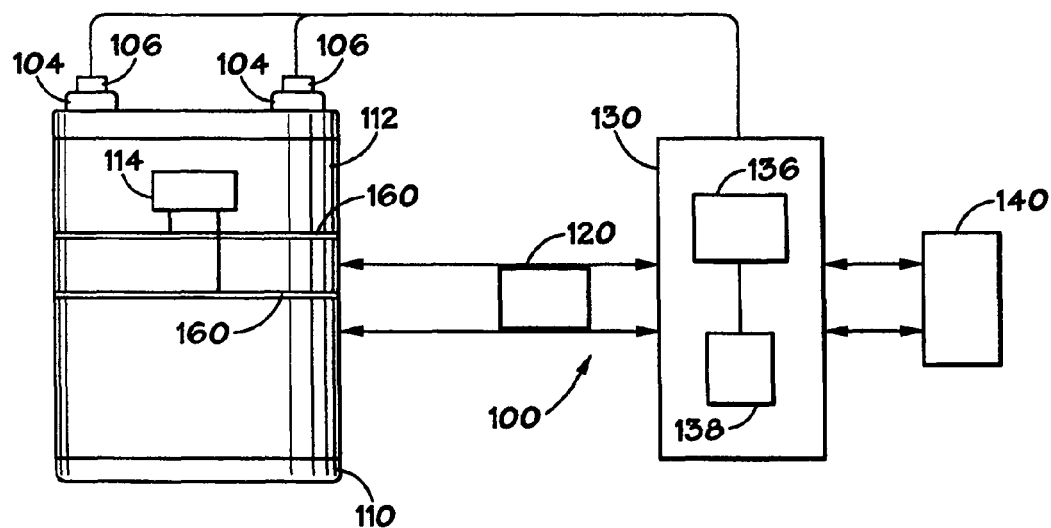
Fig. 21A

METHODS AND SYSTEMS FOR IN SITU MANUFACTURE AND INSTALLATION OF NON-METALLIC HIGH PRESSURE PIPE AND PIPE LINERS

CROSS REFERENCE TO RELATED APPLICATION

This application is a continuation-in-part of U.S. application Ser. Nos. 11/033,962 filed 12 Jan. 2005 now abandoned and 12/317,376 filed Dec. 22, 2008. The present invention and application, under the Patent Laws, claim the benefit of priority from U.S. Application Ser. No. 61/009,110 filed 26 Dec. 2007, Ser. No. 12/317,376 filed Dec. 22, 2008, and Ser. No. 11/033,962 filed 12 Jan. 2005; and said Applications are fully incorporated herein for all purposes.

BACKGROUND OF THE INVENTION

1. Field of the Invention

The present invention in certain aspects, is directed to: systems and methods for in-situ manufacture and installation of non-metallic high-pressure composite pipe and pipe liners; to lined pipe and pipelines; to high-pressure pipe liners; to pipelines with liners and fiber optic sensors; to methods for lining pipe and pipe liners; in certain particular aspects, to continuous reinforced thermoplastic pipe liner intended for use as a stand alone pipe liner in the restoration of degraded pipelines; and to large diameter continuous length reinforced high-pressure thermoplastic pipe liners.

2. Description of Related Art

It is known to use continuous composite pipe to form piping systems without the time, effort, and expense of making multiple connections between joints of pipe. It is also known to line standard water or sewer lines, but when it comes to replacing high-pressure, gas, oil and industrial piping systems in more demanding, crowded or corrosive environments, often the pipe is dug up for lining.

A wide variety of pipe, pipe liners, systems and methods are known for lining, manufacture, transport, and installation of continuous non-metallic pipe; including, and not by way of limitation, those disclosed in U.S. Pat. Nos. 7,160,409; 6,889,716; 6,357,485; 6,305,423; 6,286,557; 6,148,866; 6,065,400; 6,058,978; 5,828,003; 5,755,266; 5,072,622; 4,998,871; 4,985,196; 4,863,365; 4,384,595; 4,053,343; 4,000,759; 3,769,127; and 2,502,638. Pending patent applications co-owned with the present invention—U.S. Ser. Nos. 11/172,132 filed Jul. 1, 2005 and 11/033,962 filed 12 Jan. 2005—are incorporated fully herein for all purposes.

BRIEF SUMMARY OF THE INVENTION

The present invention discloses, in certain aspects, new in situ pipe manufacture and installation systems and methods that integrate extruded thermoplastic pipe, layers of high strength synthetic fiber fabrics and tape, and an on-site manufacturing and installation system which can replace various high-performance, high-pressure piping systems.

In certain aspects, the present invention discloses a pipe liner or a core pipe of thermoplastic material, e.g., but not limited to, HDPE or Nylon, Cross-linked HDPE or PEX, or any suitable thermoplastic pipe material that can be furnished in finite lengths of pipe welded in-line or in-situ, or extruded in-situ and spooled on a spool that is assembled on site. In certain aspects, the process speed is limited by the time to weld—including a time to cool the weld-in line if a finished length of core pipe is produced. Before starting the wrapping, in certain aspects, the process speed can be significantly increased and, in some cases doubled.

In certain aspects, wrap materials of synthetic fiber are used as a unidirectional fabric wrapped at about plus and minus 65-degrees for hoop strength (internal pressure resistance) and axial tapes of the same description (to take axial loads from hydrostatic testing or pulling a long lien into place) are used. Both the wrap and the axial tapes are coated on at least one side with a thermoplastic hot melt, such as EVA or HDPE. The wraps and axial tapes are, in one aspect, under tension and work together to realize the full potential strength of the product. In one aspect, the axial tapes and optional fiber optics are on top of the outermost wrap layer. They are held in place by a thermoplastic film/adhesive backed tape that may or may not provide 100% coverage—e.g. from 30% to 100% coverage. In operation this tape has significantly greater elongation at failure than the wrap materials and is designed not to fail first. The wrap or possibly the axial tapes will fail first. They provide some limited pressure resistance. TOWS may be used but, in certain aspects, tows do not work well because the tensions of the wraps and tows can not be adjusted such that they fail at the same time—which would be an optimum condition for total strength. The tows contribute little to the product strength in practice. Alternatively, a tow material is used with a high elongation (e.g. greater than 10%) at failure so they cannot not fail first. In certain aspects, the ends are re-rounded after wrapping. In certain aspects, quick cure fiberglass is used on pipe ends to allow cutting with minimal damage to reinforcements thereon.

In certain aspects, an entire liner according to the present invention is mechanically deformable (e.g. into a folded shape or a "C" shape so that the liner does not loose the memory of its rounded, pre-deformation shape. Tapes holding the liner in a deformed shape are easily broken when the liner is re-rounded.

The present invention discloses, in certain aspects, new in situ pipe relining systems and methods that integrate off-the-shelf extruded polyethylene, layers of carbon and fiber tape and/or layers of high strength synthetic fiber fabrics and tapes, and an on-site manufacturing and installation system designed specifically to replace various high-performance, high-pressure piping systems. Certain disclosures of this application are in the article "In situ manufacturing: Pipe relining in demanding corrosive environments," High Performance Composites, Vol. 15, No. 1, January 2007, incorporated fully herein for all purposes.

In certain aspects, the present invention discloses a portable factory which continuously manufactures and installs composite non-metallic stand-alone pipe, and/or pipe liners to form high corrosion resistant pipelines and/or to restore the performance of existing pipelines. In certain aspects, the present invention discloses a portable factory which continuously manufactures and inserts composite stand-alone pipe liners (or "core pipe") into damaged or degraded underground pipelines restoring their designed capabilities without excavation and pipe replacement. In certain aspects, the systems according to the present invention have a staged mechanical deformation device which temporarily collapses a new pipe liner, e.g., into a restorable shape, e.g. a "C" shape, reducing its diameter, e.g. by about twenty to fifty percent and, in certain aspects, by about forty percent, to ease installation as it enters existing host pipe. In one aspect, the present invention discloses methods for making a core pipe (also called a "liner") suitable for insertion into a host pipe, the methods including: welding together a plurality of pieces to form a pipe (in one aspect, in situ at a site of use), a pipe made of temperature-resistant corrosion-resistant non-metallic material, the pipe having an outer surface, an inner surface, a first end and a second end and a flow channel therethrough from the first end to the second end; wrapping the pipe with a first strengthening wrap; wrapping the pipe with a second strengthening wrap; securing a plurality of axial strength members or pulling tapes on the pipe; deforming the pipe to facilitate insertion thereof into a host pipe; wrapping the pipe following deforming with a plurality of tapes to maintain the pipe in a deformed shape during insertion into a host pipe; and wrapping the pipe with a protective outer wrap to protect the pie during installation in a host pipe. In one aspect the portable factory is a temporary structure, in one aspect about 500 feet long and about 25 feet wide.

In one particular aspect, the deformed shaped liner, after deformation, is wrapped with a holder, e.g. tape, e.g., in one aspect, Mylar tape which holds the liner in the deformed configuration while it is installed in a pipe.

In another particular aspect, the deformed liner is wrapped with either an adhesive backed thin plastic film, e.g., in one aspect, a film of HDPE (high density polyethylene) (in one aspect, with partially cured relatively sticky butyl rubber adhesive) to maintain the liner components in position and to protect the liner during installation; or with a thin sleeve, e.g. with a thin plastic film, e.g., in one aspect, a film of HDPE (high density polyethylene) (in one aspect, with partially cured relatively sticky butyl rubber adhesive) to maintain the liner components in position and to protect the liner during installation.

In one aspect, the present invention discloses core pipe which is non-metallic and core pipe which is suitable for insertion into a host pipe, the core pipe including: a pipe made of temperature-resistant corrosion-resistant material, the pipe having an outer surface, an inner surface, a first end and a second end and a flow channel therethrough from the first end to the second end; a first strengthening wrap around the pipe; a second strengthening wrap around the pipe; a plurality of spaced-apart axial strengthening members or pulling tapes positioned longitudinally on the pipe; in one aspect, the pipe, optionally, deformable to facilitate insertion into a host pipe; and a protective outer wrap on the pipe for protection installation and/or during insertion into the host pipe. U.S. Pat. No. 7,374,127, co-owned with the present invention, discloses apparatus for wrapping material on pipe and is incorporated fully herein for all purposes.

The present invention discloses, in certain aspects, methods for pulling a core pipe (in one aspect, a non-metallic core pipe) into a host pipe, the methods including: inserting a pulling rope through the host pipe so that the pulling rope extends through the host pipe, connecting the pulling rope to axial strength members or to pulling tapes of a core pipe, the core pipe having a pipe made of temperature-resistant corrosion-resistant non-metallic material, the pipe having an outer surface, an inner surface, a first end and a second end and a flow channel therethrough from the first end to the second end, a first strengthening wrap around the pipe, a second strengthening wrap around the pipe, a plurality of spaced-apart axial strength members or pulling tapes positioned longitudinally on the pipe, the pipe deformable to facilitate insertion into a host pipe, and a protective outer wrap on the pipe for protection during installation and/or during insertion into a host pipe, pulling the pulling rope with pulling apparatus to pull the core pipe into the host pipe until an end of the core pipe reaches an end of the host pipe and core pipe is along the entire length of the host pipe. Accordingly, the present invention includes features and advantages which are believed to enable it to advance pipe lining technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention, in at least certain embodiments, discloses pipe liners, methods to make them, methods to install them, and lined pipe or pipelines with a multi-component liner and, in one aspect, a fiber optic sensor system and/or a communications system, e.g. a fiber optic communications system. Certain pipe liners produced in accordance with certain embodiments of the present invention are a stand-alone structure which is capable of withstanding operating and installation loadings and, optionally, with embedded measurement and redundant sensing devices for monitoring the integrity of a restored pipeline on a continuous basis. The present invention also discloses lined pipe and pipelines with the capability for communications/control through a communication system, e.g. a fiber optic communication system with fiber optic cables and/or apparatus, in one aspect with collection and removal apparatus of any permeated fluids. In certain particular aspects, the present invention discloses pipelines (e.g. relatively large diameter degraded pipelines) which are restored to original or near-original specification without digging and without replacement.

The present invention discloses, in at least certain aspects, a light-weight high-strength yet flexible multi-component pipe liner structure that can be installed as a stand-alone pipe liner restoring a pipe or a host pipeline to (or near) its original performance parameters and original service life, while providing increased internal and external corrosion protection and increased protection from damage, e.g. during earthquakes, accidents, and acts of terrorism. In certain aspects, a "stand-alone" pipe liner as used herein is a pipe liner that withstands all (or substantially all) installation and operational loads without assistance.

The present invention discloses, in at least certain aspects, a liner with sufficient axial strength to allow for the lining of existing pipelines with lengths in excess of several miles (e.g. in excess of five miles or in excess of ten miles), in one aspect with single pull installation.

The present invention discloses, in at least certain aspects, apparatus and structure within a pipe or pipeline for collecting and handling permeated fluids, especially gases, that might otherwise cause the pressure barrier to collapse when pipeline pressure is reduced (and, in some cases, suddenly reduced).

The present invention discloses, in at least certain aspects, a method for continuous measuring and monitoring of the integrity of a pipeline.

The present invention discloses, in at least certain aspects, apparatus and systems for the remote operation of pipeline apparatuses, pipeline control devices, and control valves.

In certain aspects, the present invention discloses a stand-alone reinforced thermoplastic pipe liner of continuous length with: a layer of polymeric material; two or more layers of fabric reinforcement material; an axial strengthener [e.g. axial tapes (in one aspect, fiber tapes) or socks, or flattened tubes, e.g., in certain aspects, made from synthetic fiber based material and/or carbon fiber based material, or any suitable high strength fiber or material disclosed herein] for pulling and increasing strength; orbitally wound tapes and/or fibers to lock the tapes (in one aspect, axial tapes) in relationship to the fabric reinforcement; optionally, one or a series of fiber optic cables; and, optionally such cables covered by a protective layer, e.g. a protective polymer layer, which, in certain aspects mitigates installation damage and provides structure for collecting and removing permeated fluids. In certain aspects a pipe liner according to the present invention is designed for long term service (fifty years or more) at maximum allowable operating pressures up to 2,000 psi (136 bar) with safety factors in a range from 2.8 to 5.8 or from 2.8 to 3.8 against Short Term Burst.

In one particular aspect a first layer of a pipe liner according to the present invention is a first polymeric layer which is an extruded cylindrical thermoplastic or modified thermosetting resin material, such as polyolefin, polyamides, polyvinyl chlorides and alloys thereof, HDPE and polymeric materials that have sufficient resistance to chemical attack and strength to be used in applications involving the transport of hydrocarbons and water. Such materials are readily available worldwide and have had extensive usage in the transportation of natural gas, hydrocarbons and water. An extruded cylinder is produced in long, yet transportable, lengths for ease of inspection and transport to the fabrication site. These discrete length cylinders of polymeric material are welded together, e.g. butt fusion welded, to form a continuous-length inner pressure barrier for the pipe-liner. The weld is accomplished using existing technology in conjunction with, preferably, rapid cooling techniques, to increase the process speed. Both the external and internal weld beads are, optionally, removed during the process and each weld is subjected to a 100% volumetric non-destructive integrity test.

Application of internal pressures to the non-reinforced cylinder results in an expansion of the diameter thereby thinning the wall thickness to the point of breaking, or the pressure is discontinued. Extruded thermoplastic pipe liners used in the past have relied upon the wall thickness of the host pipe to restrict expansion and support the applied pressure without damaging the pipe liner. Development of reinforced plastic pipe has shown that reinforcement applied over the extruded liner allows the pipe to resist higher pressures. In certain aspects of a liner according to the present invention, the first polymeric layer has a ratio of cylinder outside diameter to wall thickness, sometimes referred to as the Standard Dimensional Ratio ("SDR"), within the range from 26 to 36. This ratio allows handling of the cylinder without buckling while enhancing the desired flexibility of the pipe liner.

Reinforcement added to the first layer cylinder of the pipe liner is two or at least two layers of fabric (preferably, but not necessarily, unidirectional fabric) applied under tension and, in one aspect, at essentially equal but opposite angles (that is, plus and minus the same angle, with respect to the pipe liner axis). In certain aspects, each layer of reinforcement of the pipe liner is a single width of fabric. Each width of fabric can have several individual thicknesses of reinforcement material. In certain aspects the material used is one of several advanced reinforcement fiber materials commonly referred to as "ballistic materials" or "extended chain polyethylene ballistic material". This material is light weight, exhibits high specific strength, high specific stiffness, low elongation or stretch, and is similar, in some aspects, to the inner liner material.

In certain aspects, the width of the fabric is determined by the relationship:

Coverage=width/($\pi$) (Outside Diameter) (cosine $\phi$)

(where $\phi$ is the fabric winding angle)
For example, in one particular case:

Coverage=width/$\pi D$ Cos $\phi$

For 100% coverage: Coverage−1.00 and Cos $\phi$=width/$\pi D$
e.g. for a pipe liner with
D=4.500 inches and
Width=8.00 inches,
then Cos $\phi$=8/(3.1416)(4.500)=0.5659 and $\phi$=55.53°

For certain aspects of the present invention, the desired coverage is 100 percent and the nominal value of $\phi$ ranges between 50 and 60 degrees, e.g., in one aspect, 54.7 degrees. The outside diameter of the pipe liner increases with each reinforcement layer resulting in a required increase in the fabric width for each layer. For certain aspects of the present invention, the angle $\phi$ may be adjusted slightly to produce 100 percent coverage using a single fabric width. In one aspect a thin polyolefin liner (e.g. a layer 10 as described below) resists pressure until the reinforcement becomes loaded and the further increase in pressure is transferred to the reinforcement. This transfer in loading appears to take place at approximately one third of the maximum allowable operating pressure.

Because the materials of construction may have extremely low coefficients of friction, the first reinforcement layer is, optionally, locally bonded to the inner liner and the reinforcement layer(s) are bonded to each other, e.g. using application of a heated roller under pressure to melt and bond thermoplastic hot melt coating on the reinforcing members; or e.g. using any suitable adhesive, e.g. a glue or rapidly curing adhesive and/or tape. Bonding takes place at one, two, three, four or more independent narrow axial strips (or intermittent amounts of glue or adhesive) equally spaced on the circumference of the substrate. In certain aspects the total width of the axial strips makes up no more than 10% of the circumference of the inner liner (first layer cylinder). The limited bonding is used to maintain the flexibility of the pipe-liner while holding the reinforcements in place during subsequent manufacturing operations and installation.

To permit long lengths of the inventive pipe liner to be installed using a single pull, in certain aspects, one or a plurality, e.g. between 2 and 8 tapes, socks, or tubes (e.g. synthetic fiber tapes and/or carbon fiber tape) are spaced around and on top of the fabric reinforcement and bonded to the surface, e.g. using a heated pressure roller and/or using a rapidly curing adhesive. A second set or layer (and in one aspect a third) of tapes may, optionally, be installed on top of the first. The actual number of tapes will vary depending upon the pipe liner diameter and desired tensile strength. In certain aspects, the tape used is a near 100% unidirectional fiber tape produced from high-modulus VECTRAN (TRADEMARK) fibers and/or high-modulus high-strength carbon fibers. In certain aspects relatively stiff fiber tape is used with a matrix material (e.g. epoxy or similar material) and/or at least one side of the pipe is coated with thermoplastic hot melt materials. In certain aspects no matrix or filler material is used and the tapes are soft and flexible. In certain aspects, fiber bundles or tows range from 12,000 to 50,000 filaments and multiple tows are used. The fibers may be stitched together. Each of the axial strength members or pulling tapes is laid on the pipe, e.g. in a substantially axial or zero degree position with respect to the axis of the pipe liner, in one aspect, while under tension. In certain aspects, the actual angle with respect to the axis will be in the range from 0 to 10 degrees. In one aspect, the pulling tapes are configured and located so that, when a completed liner is folded, e.g. into a "C" shape, for insertion into a pipe, the pulling tapes help maintain the liner in the "C" shape during such insertion.

In one embodiment, with the tapes installed, either a thermoplastic film backed with a partially cured butyl rubber adhesive are orbitally wound on top of the tapes and optional fiber optic cable if present, to secure them in place; or high strength ballistic material fiber tows are orbitally wound on top of the tapes to secure them in place. This over-wrapping need not provide 100% coverage. In certain aspects, the angle of the tows is ±54.70 nominally and in the range of 50° to 60°. Fiber tows are used to help fix the fiber tapes' relationship with the reinforcement and ensure that the low coefficient of the ballistic fiber fabric and tape will not permit relative movement between the two. Fixing the relationship between the reinforcement fabric and the carbon fiber tapes (or socks or tubes) insures that both materials strain at the same or substantially the same rate, provides additional tensile strength for pulling, and allows greater hoop loading of the fabric. In one aspect, the axial strength members or tapes are selected to provide much greater elongation at break than the fabrics to ensure that they continue to hold components in place until failure occurs. First failure will not be in the adhesive backed thermoplastic film.

With the reinforcement in place, components of a continuous measuring, monitoring and communications systems are, optionally, bonded to the pipe surface. In one aspect, the fiber optics go on at the same time as the axial strength members or tape and parallel to them and are held by the same adhesive backed films. This system is intended, in certain aspects, to allow monitoring on a continuous or intermittent basis as determined by the pipeline operator. The system is a fiber optics system. In certain aspects this system is attached to the pipe as a continuous thermoplastic tape, with each tape including two fiber optic cables (one for temperature, one for strain) or four fiber optic cables (two plus two additional cables for redundancy). One half of the fiber optic cables are further enclosed within a tubular void space into which the cables are placed. The other half is embedded within the thermoplastic material. The monitoring system, in one aspect, has a minimum of one such tape and, in one aspect, has at least two such tapes located at 90° to each other and placed on the pipe axially and/or helically. The fiber optic cables enclosed within the tube are designed to allow distributed temperature measurement over great distances. Only one fiber optic cable is required for temperature measurement, the other(s) are redundant and can be used to replace a damaged cable if and when necessary. In one aspect, the fiber optic sensors will respond to localized changes in temperature with an accuracy of about 4° F. and locate the position of the temperature anomaly within about six feet. Changes in temperature reflect a leak or impending leak. The half of the fiber optic sensor(s) embedded within the thermoplastic tape is used to measure localized strains along the length of the pipe. Again, only a single fiber optic cable is required for this measurement, the others are provided for redundancy. The strain sensor, in one aspect, is embedded in the tape which is anchored to the pipe liner wall. Changes in strain level of the pipe liner are measured to an accuracy of about 20 micro-strain ($\mu\epsilon$) and the position of the anomaly is located within a small range, e.g. within about six feet. The data from this sensor, correlated with long term test data (e.g. from regression analysis, e.g. from an ASTM D 2992 test, allows a determination of the integrity of the pipe liner on a continuous basis and further allows corrective action to be taken before a failure or incident occurs.

In addition to the monitoring system, additional fiber optic cables can be provided, according to the present invention, for use in a communications and control system. These fiber optic cables can be included within the tapes mentioned or within separate tapes. Such a system with these fiber optic cables provides a communications and control function to be used to interface with a control/monitor system, remote or on-site, e.g. a pipeline supervisory control and data acquisition ("SCADA") system and to operate pipeline devices and controllers. Pipeline valves, external to a pipe liner according to the present invention, can be controlled using these cables. In one aspect, the sensors and communications lines are integrated through an existing operating system to provide for control, indications of potential problems, automatic alarms and/or shut down of the pipeline or of apparatuses thereon.

The monitoring system package and reinforcement is protected by a polymeric cover or jacket that, in one aspect, is formed from a tape of thermoplastic film with partially cured butyl rubber adhesive orbitally wound on the pipe or pipe liner. The cover is wound such that 100% coverage is obtained. The monitoring system package and reinforcement is, optionally, protected by a polymeric cover or jacket that, in one aspect, is formed from a sheet of material whose width is approximately the same as the circumference of a reinforced pipe liner made, e.g. of polyolefin, nylon, polyvinyl chloride (PVC), high density polyethylene and the like. The sheet, in one aspect, is rolled to form a continuous cylinder that fits tightly around the pipe and is welded to itself to prevent incursion of external debris and or fluids. The cover is on top of the fiber optic packages to protect them from wear and handling damage during folding and pulling into the host pipe. Alternatively a cover is made by coating the structure with a layer of plastic or similar material, e.g., but not limited to, polyurethane, e.g. polyurethane S-355 from IR Products. Such material may be sprayed on or painted on.

This placement results in an annular space between the pipe reinforcement and the inside of the cover sheet due to the presence therebetween of the fiber optic sensors. Spacers are, optionally, placed between the sensor tapes as necessary to support the cover (e.g., separate spacers made of plastic, wood, extruded thermoplastic or thermosetting material or spacers that are integral to a cover). Additionally, in certain aspects, these spacers are, optionally, shaped to permit the accumulation of permeated fluids from the flowing fluid to be vacuumed at an external vent port so there is no accumulation of pressure that might result in damage to the pipe liner. Monitoring the amount of fluid removed and/or pressure relieved provides an additional indication of the integrity of the pipe liner.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide the embodiments and aspects listed above and:

New, useful, unique, efficient, non-obvious systems and methods for in-situ manufacture of large diameter continuous non-metallic reinforced pipe, pipe liners and pipelines.

New, useful, unique, efficient, nonobvious systems and methods for lining pipe and pipelines;

Such systems including a portable factory for making and/or lining pipe;

Such systems and methods including wrapping a deformed liner with tape prior to insertion of the liner in a pipe; and Such systems and methods including wrapping a deformed liner with a sleeve prior to insertion of the liner in a pipe.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

FIG. 20 is a cross-section view of a prior art fiber optic cable.

FIG. 21A is a schematic drawing of a system used with liners according to the present invention.

Figure 1:
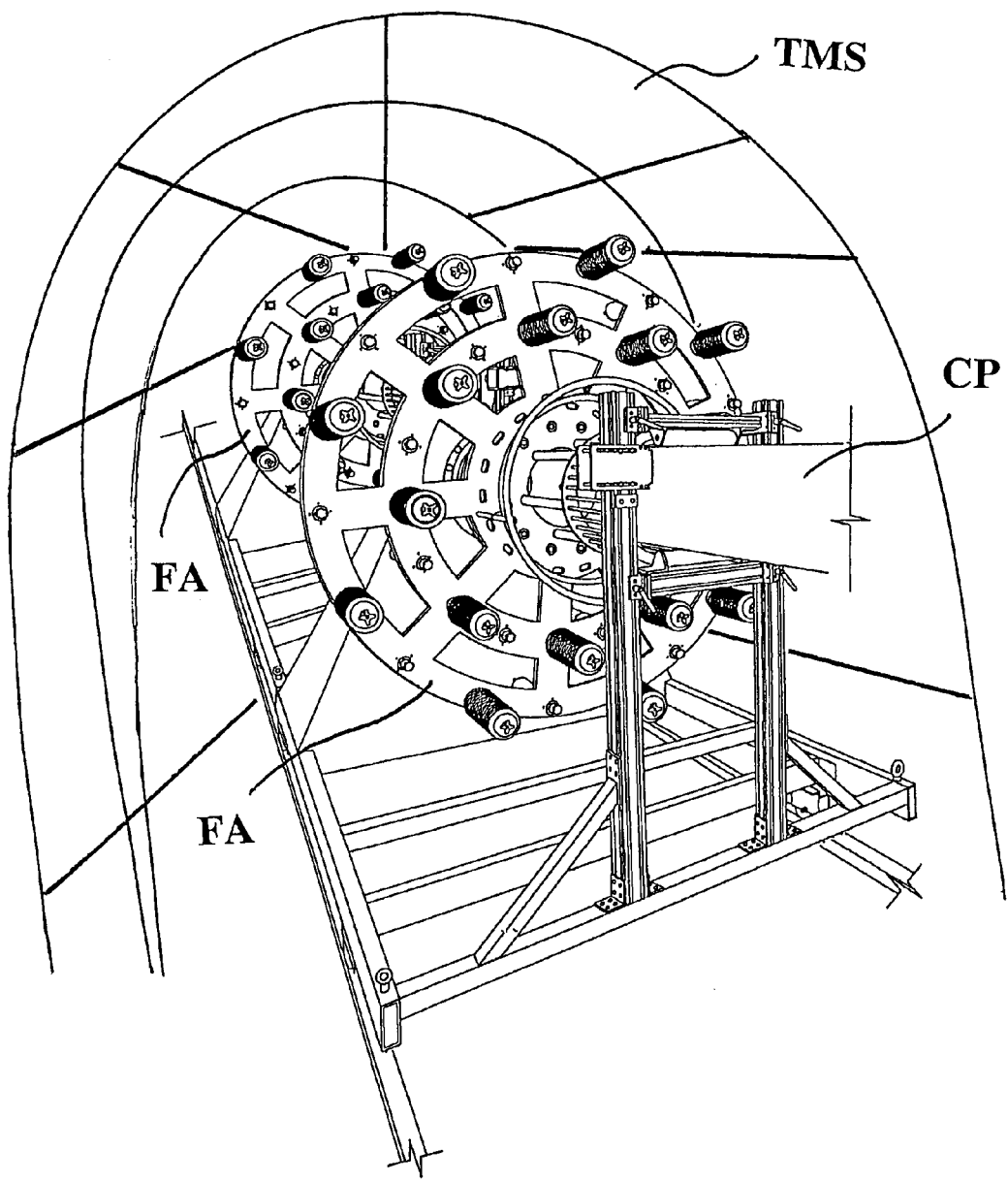
FIG. 1 is a perspective view of part of a system according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

In one embodiment, the construction and installation of a high-pressure liner according to the present invention are done on site nearly simultaneously; e.g. in a temporary manufacturing shelter TMS (see FIG. 1) which protects equipment used in methods according to the present invention as well as personnel during manufacturing and installation. One end of a host pipe (the pipe to be lined and/or replaced) is exposed, and, if necessary, a long, temporary manufacturing structure, e.g., a tent or portable enclosure (e.g. shelter TMS), is erected to protect material, control systems and workers from the elements. At the terminus of the host pipe is equipment and computer control systems designed primarily to help pull and guide the new pipe through the host pipe.

Figure 2:
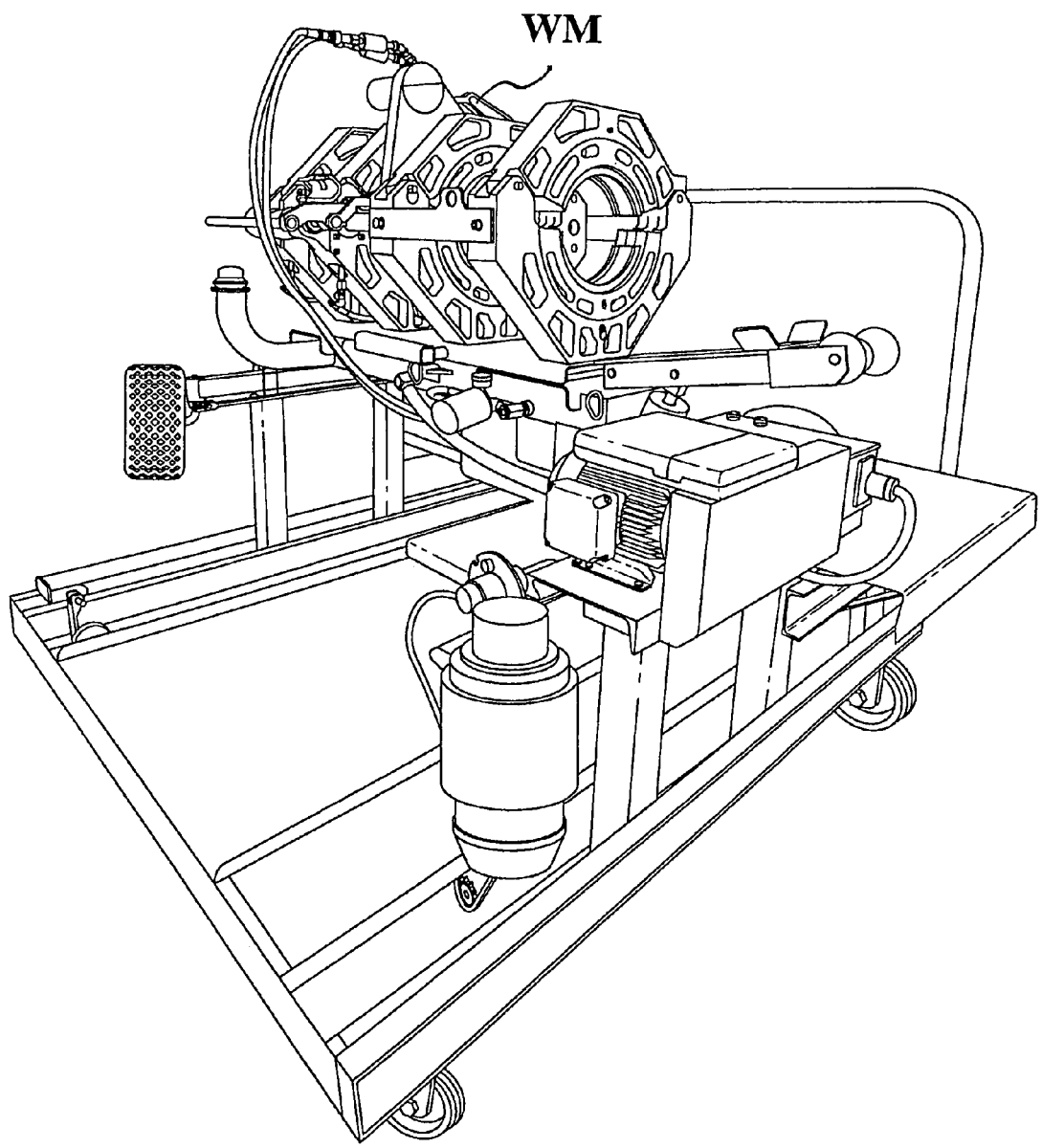
FIG. 2 is a perspective view of a fusion welding machine of the system of FIG. 1.
Figure 10:
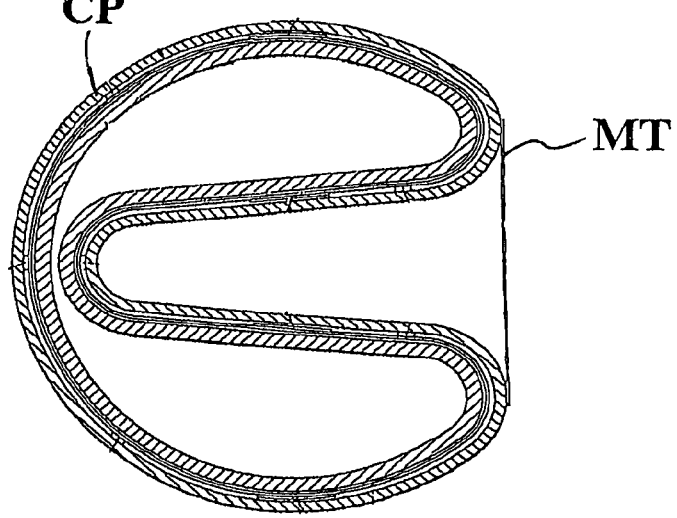
FIG. 10 is a schematic view of a pipe according to the present invention.

The manufacturing tent, in certain aspects, up to 500 feet long or more, is the site of an intricate assembly line that connects, wraps, and prepares the new pipe for insertion into the host pipe. According to the present invention, pipe coatings and wrap materials can vary. In one particular aspect fo the present invention, a pipeline is manufactured in the following order, working from the inside out:

1. HDPE core pipe, butt fusion welded (using a machine as in FIG. 2), is made
2. High Strength braided fabric sleeve, Wrap 1, is wrapped (see FIG. 3) on the pipe
3. High Strength braided fabric sleeve, Wrap 2, is wrapped (see FIG. 4) on the pipe
4. Carbon fiber pulling tapes are applied to the wrapped pipe (see FIG. 5)
5. Fiber optic sensors are secured to the pipe (Step 5 optional)
6. High Strength fiber tow, Wrap 3, is wrapped on the pipe (see FIG. 6) (Step 6 optional)
7. High Strength fiber tow, Wrap 4, is wrapped on the pipe (see FIG. 6) (Step 7 optional)
8. Pipe deformed for fit in host pipe (see FIGS. 7, 10)
9. Mylar tape wrapped on the pipe to maintain deformation during insertion (see FIG. 8)
10. HDPE film protective outer wrap wrapped on pipe In one aspect, a 40- to 50-foot section of HDPE pipe is used as the core pipe, e.g. standard extruded PE 100 pipe (or other material—PEX, PA-11 or PVDF) if temperature or corrosion factors dictate it. Pipe diameter depends on the diameter of the pipe being replaced (the host pipe), and, in certain aspect, ranges from 6 inches up to 16 inches (and in one aspect, is about 12 inches). Wall thickness of the new pipe is as desired and in certain aspects depends on the application and environment (e.g., but not limited to, in one aspect, about 4 mm and up to 7 mm and in another aspect 7 mm up to an SDR of 32.5 ("SDR" is the outside diameter of pipe divided by the thickness of the pipe). The total quantity of HDPE core pipe required for a given project depends on the total length of the host pipe which can range from a few hundred feet up to 10 miles or more (e.g., but not limited to, about 2 miles to about 2.5 miles).

HDPE core pipe sections are brought together in the assembly line and butt fusion welded end-to-end, e.g. using a fusion welding machine WM (FIG. 2), e.g. a commercially available TracStar fusion machine provided by McElroy Mfg. Inc. (Tulsa, Okla.). This is followed by welding inspection to verify that a leak-proof seal exists between core pipe components. Fabric material and/or sleeve material, e.g. in one aspect, SPECTRA (TRADEMARK) material braided sleeve and, in another aspect, high strength synthetic fiber material braided sleeve is used for Wraps 1 and 2. Two layers of a high strength braided fabric material is co-helical wrapped around the pipe using two concentric tape winders and controlled by a control systems, e.g., a system with one or more computers and/or PLC's. Any desirable wind angle may be used for Wraps 1 and 2; and, in one particular aspect, positive and negative wind angles (in one aspect, plus-or-minus 65 degrees) are used.

Figure 3:
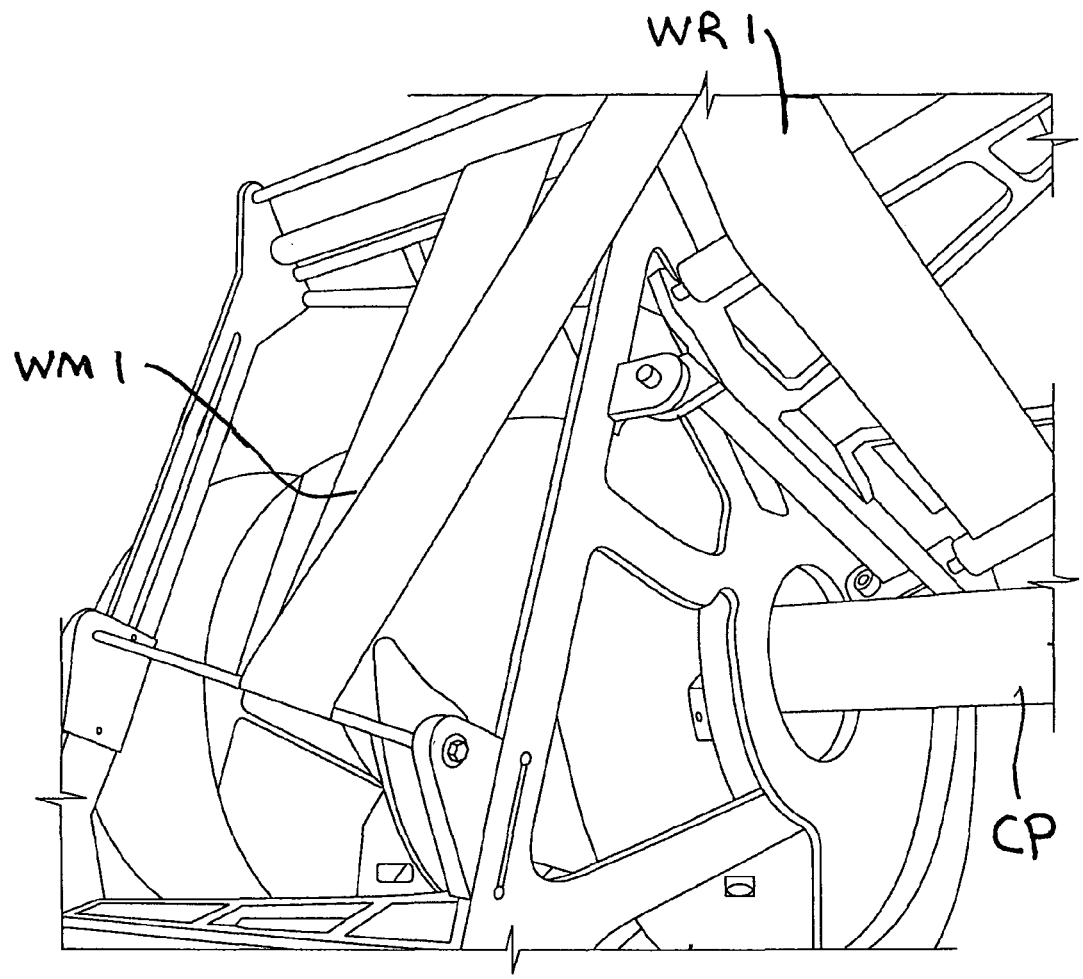
FIG. 3 is a perspective view of a wrapping step in a method according to the present invention using the system of FIG. 1.
Figure 4:
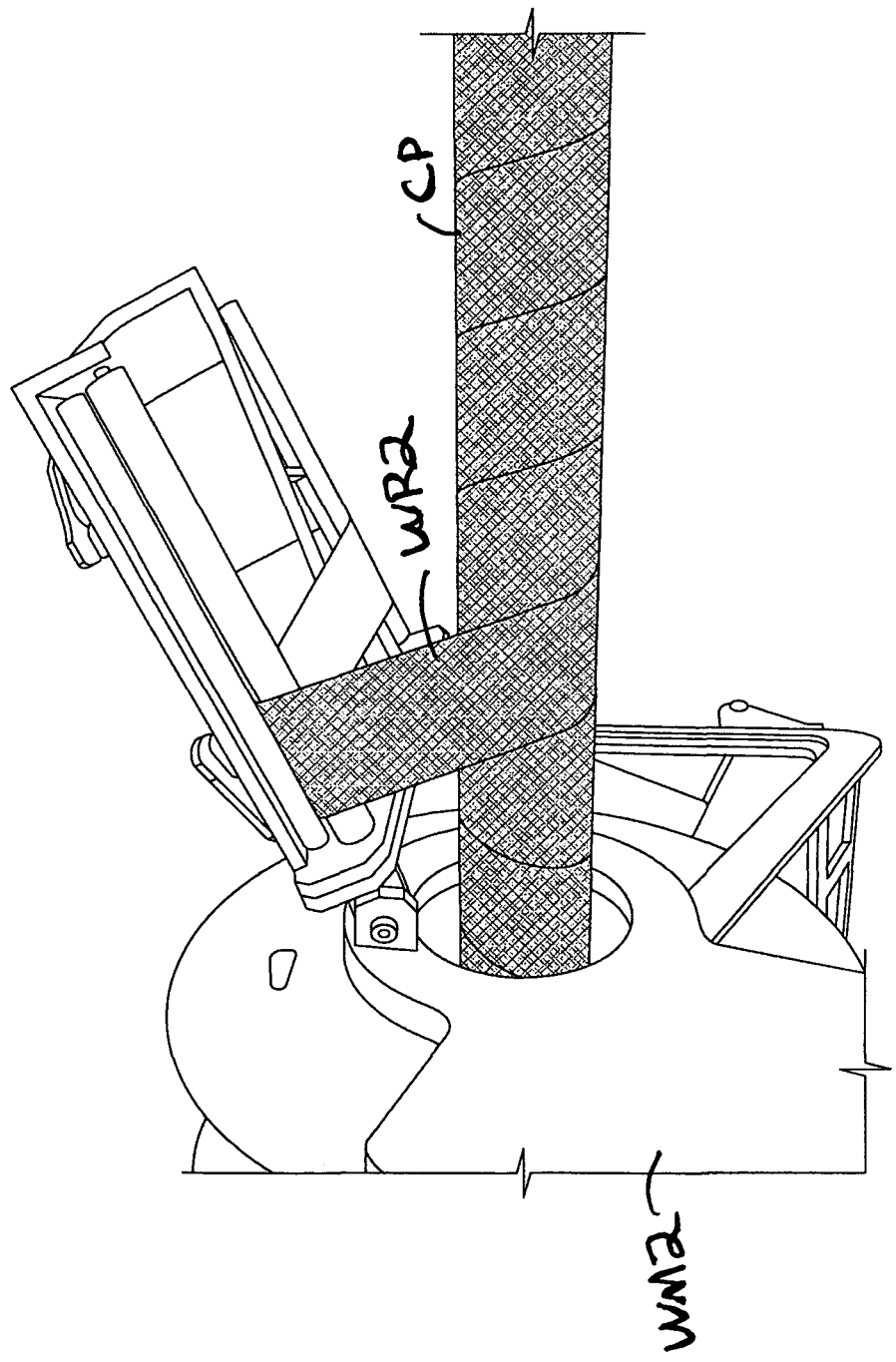
FIG. 4 is a perspective view of a wrapping step in a method according to the present invention using the system of FIG. 1.

FIG. 3 illustrates the wrapping of Wrap 1 material WR1 onto a new core pipe CP by a wrap machine WM 1 (e.g., but not limited to, about 6 inches wide). FIG. 4 illustrates the wrapping of Wrap 2 material WR2 onto the core pipe CP by a wrap machine WM2. In one aspect Wrap 1 and Wrap 2 are wound at winding angles (positive and negative) of about 65 degrees.

VECTRAN (TRADEMARK) fiber material is made from liquid crystal polymer material run through a known fiber spinning process and supplied by Kuraray USA and braided by A&P Technology which provides a commercially available basket woven fabric made of this material. SPECTRA (TRADEMARK) material is made from ultrahigh molecular weight polyethylene run through a patented gel-spinning process, supplied by Honeywell Advanced Fibers and Composites (Colonial Heights, Va.). Hexcel (Dublin, Calif.) provides a commercially available basket-woven fabric made of this material. In one aspect, as used in methods according to the present invention, a coating is added to the woven fabric—e.g. in one aspect the commercially available EVA coating applied by JHRG LLC (Spring Hope, N.C.) and, in another aspect, a hot melt thermoplastic coating added to the fabric—to prevent unraveling and slipping, before it's finally wound around the pipe.

The VECTRAN (TRADEMARK) material or the SPECTRA (TRADEMARK) material has a high strength-to-weight ratio; is reported to be pound-for-pound ten times stronger than steel; has an ability to resist chemicals, water, and light; and an ability to provide the structural and pressure support needed, without adding a great deal of weight. In one aspect the VECTRAN (TRADEMARK) material or the SPECTRA (TRADEMARK) material is used in its dry form only without the addition of a resin which does not increase the stiffness of the pipe. Any other suitable wrap material can be used for wraps 1 and 2; e.g. SPECTRA (TRADEMARK) material hybridized with materials that do not creep or a triaxial braided wrap material with unidirectional VECTRAN (TRADEMARK) or S-Glass and hot melt thermoplastic fibers, e.g. as commercially available from A&P Technologies.

Figure 5:
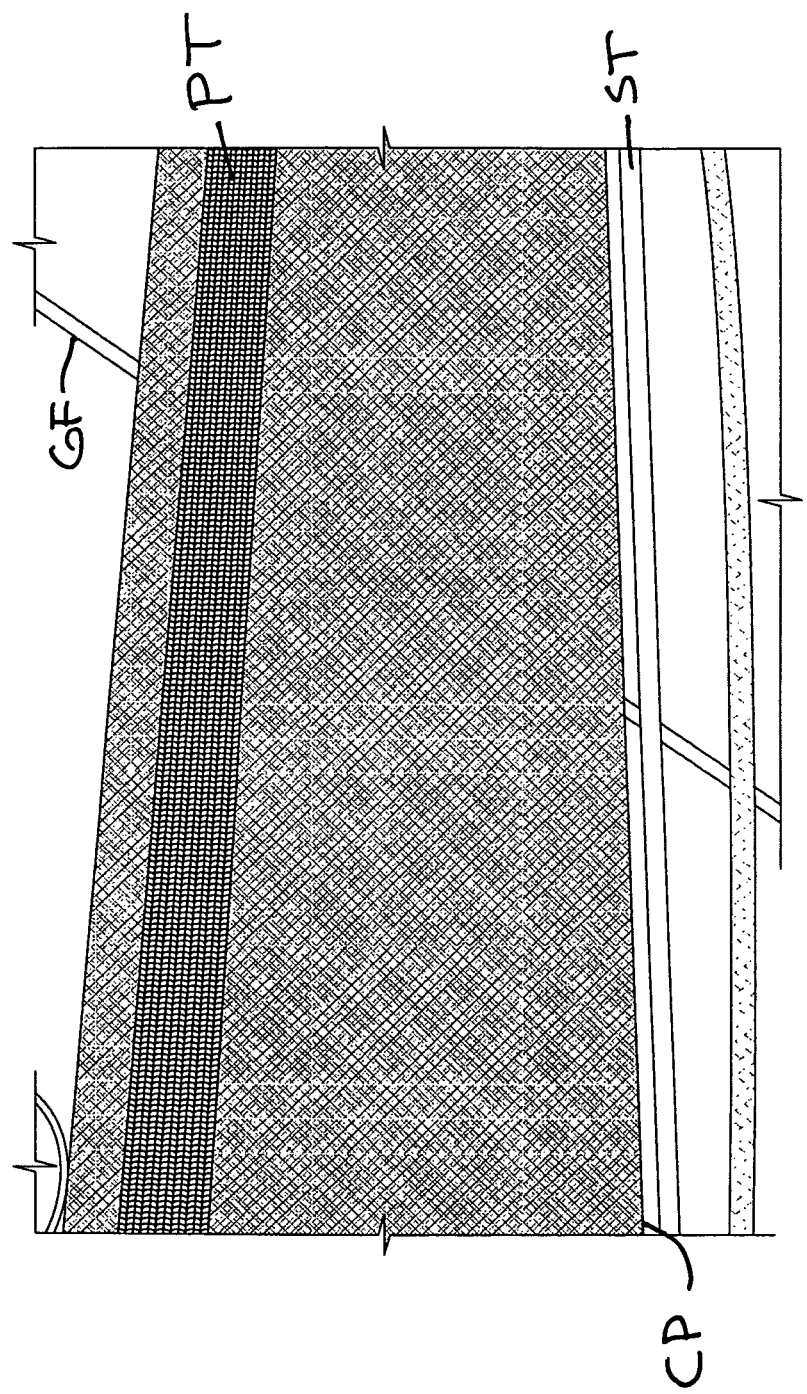
FIG. 5 is a perspective view of a step in a method according to the present invention using the system of FIG. 1.
Figure 6:
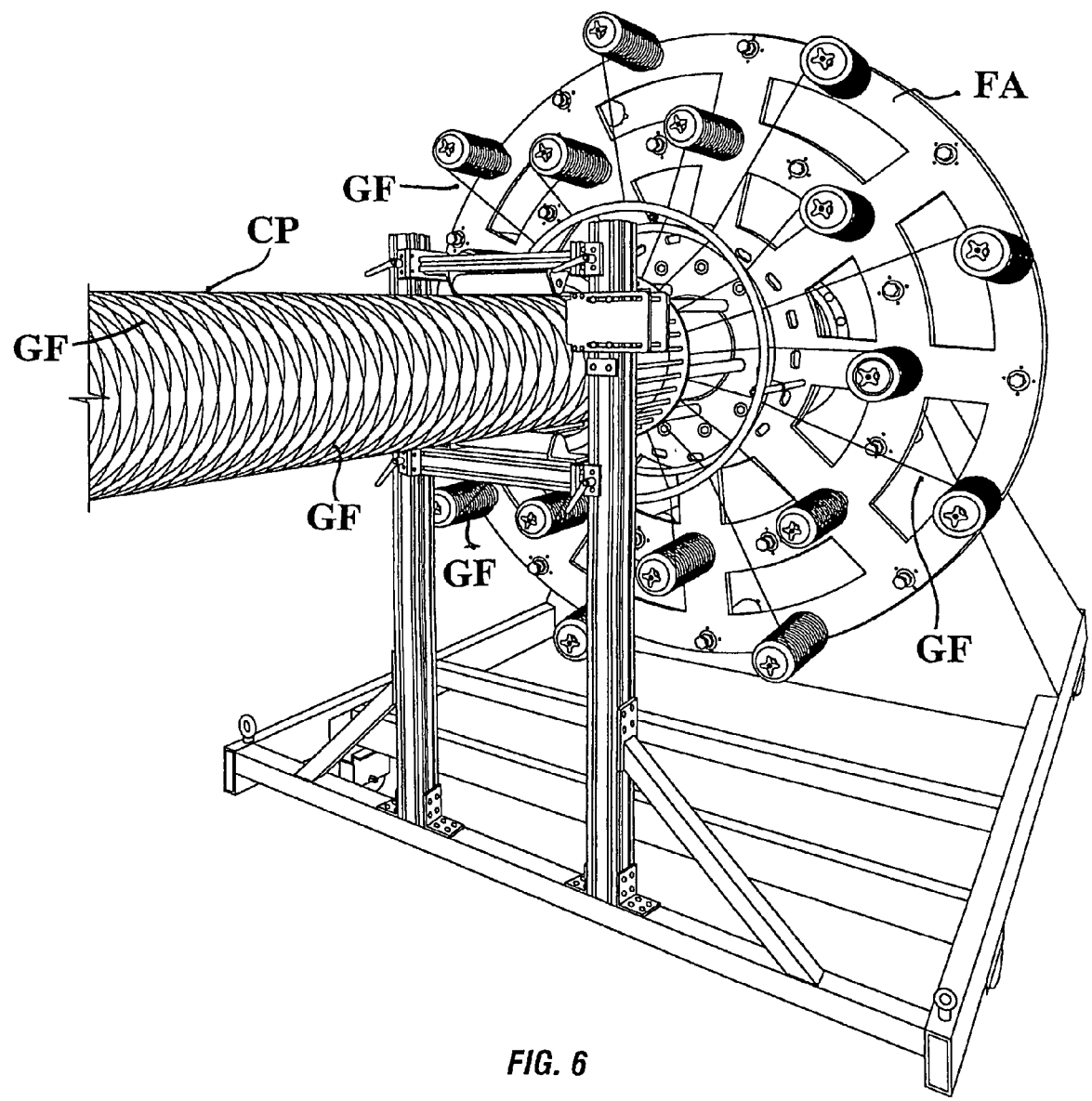
FIG. 6 is a perspective view of a step in a method according to the present invention using the system of FIG. 1.

As shown in step 4, FIG. 5, axial strength members or pulling tapes PT are applied and running the length of the pipe CP; e.g., multiple tapes, e.g. four continuous synthetic fiber and/or carbon fiber pulling tapes. Spaced at equidistant intervals around the perimeter of the pipe, in one aspect, each tape is a triaxial lay-flat sleeve 1 to 3 inches in width that runs the length of the pipe on a the degree axis. In one aspect, a 50K, 34-550 carbon fiber braid tape, brand-named TRIMAX (TRADEMARK), provided by A&P Technology Inc. (Cincinnati, Ohio) with a thermoplastic hot-melt coating may be used. VECTRAN Fiber (TRADEMARK) triaxial fabric, provided by A&P Technology Inc. (Cincinnati, Ohio) with a thermoplastic hot melt coating may be used. As the tape is applied, the material may be ironed (flattened) in place and the heated thermoplastic wets out the fibers.

Figure 9:
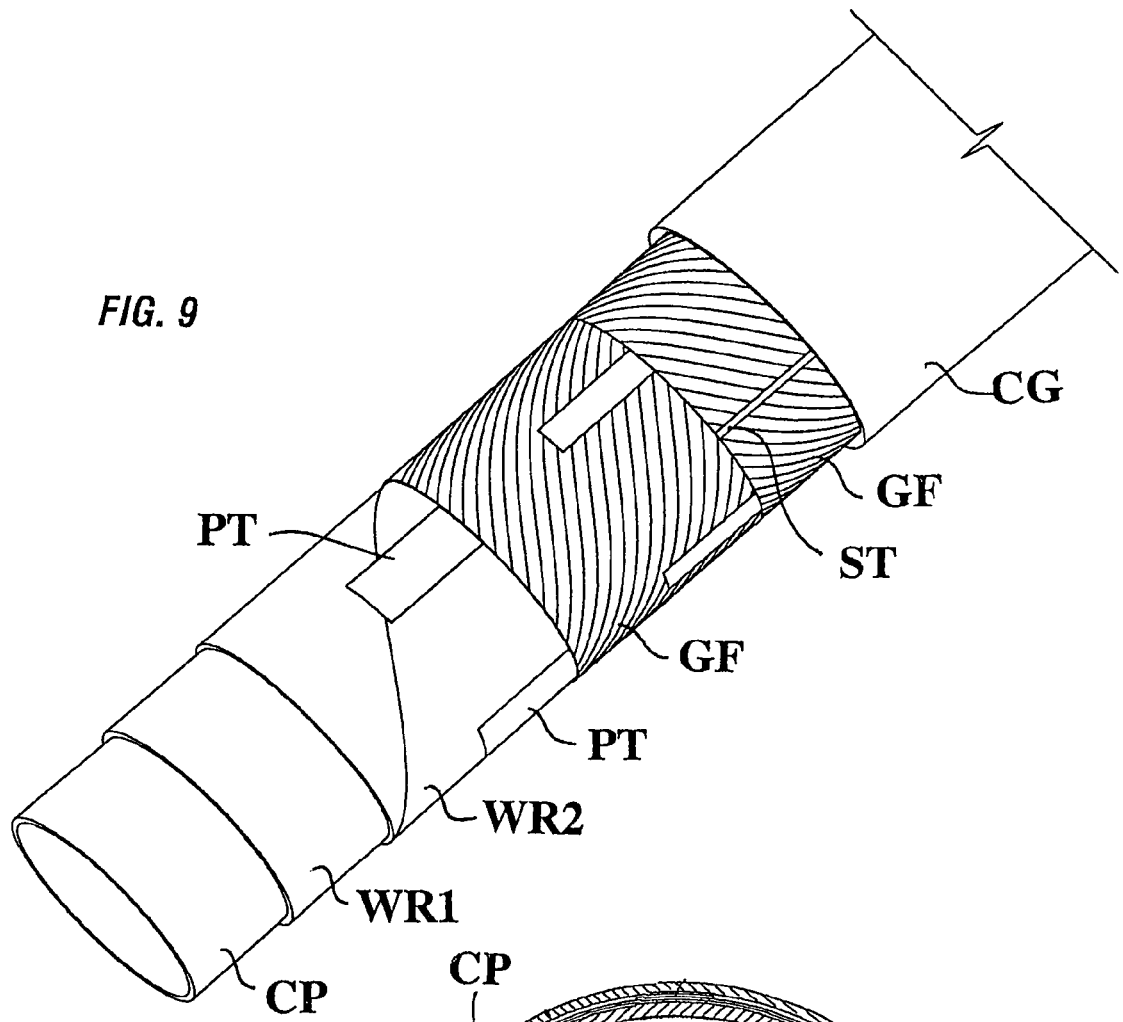
FIG. 9 is a schematic view, partially cutaway, of pipe liner made with a system according to the present invention.

On the same layer as the axial strength members or pulling tapes, fiber optic sensors are, optionally, applied along the length of the core pipe as strips ST (see FIG. 9) of encapsulated fiber optic sensors, optionally running the entire length of the liner (see, e.g., FIGS. 5, 9). It is these sensors that provide signals indicative of applied tension which are processed by the control system to provide monitoring of the pipe as it is made. The fiber optic sensors also function during and after core pipe installation in a host pipe: During liner pulling (installation of core pipe) these sensors provide data on pipe tension and integrate with the pipe-pulling system, controlled by the control system, to adjust on-the-fly to increased and decreased tension. After installation, the sensors can (within a limited distance; e.g. in one aspect, within 3.1 feet) detect leaks, sense displacement and/or report temperature along the pipe, all of which help a pipeline manager monitor pipe integrity and anticipate potential failures.

In one aspect, glass fiber tow GF is used in Wraps 3 and 4 (e.g., E-glass fiber tows commercially available from Fiber Glass Industries Inc. (Amsterdam, N.Y.); or, e.g. 3000 denier polyester fiber. In one aspect, tapes of thermoplastic film backed with a partially cured rubber adhesive are used in Wraps 3 and 4 (e.g., tapes commercially available from TEK RAP, Houston, Tex. Next in the assembly line the tapes or tows are wound by a fiber applying machine FA on the core pipe CP (see FIG. 6); e.g., wound at alternating angles (plus-minus 65 degrees); in one aspect, with up to 36 tows in each layer and in one aspect, with up to 18 tapes in each layer. These tapes or tows GF secure the axial strength members and/or fiber pulling tapes and the fiber optic strips. In one aspect, these tapes or tows GF can provide pressure support. In another aspect, these tapes or tows GF are designed to provide only minimal pressure support for the pipe CP itself. In one aspect, the tapes are designed with sufficient elongation at failure that they will not fail before the strengthening wraps 20 and 30. The tapes provide from 30 to 100% coverage of the outer surface of the reinforced pipe. The tows GF are, in one aspect, commercially available standard E-glass. Optionally, there are no tows, but there are tapes of HPPE/rubber coated applied by a machine like the machine FA modified if needed due to differences in the tapes.

Figure 7:
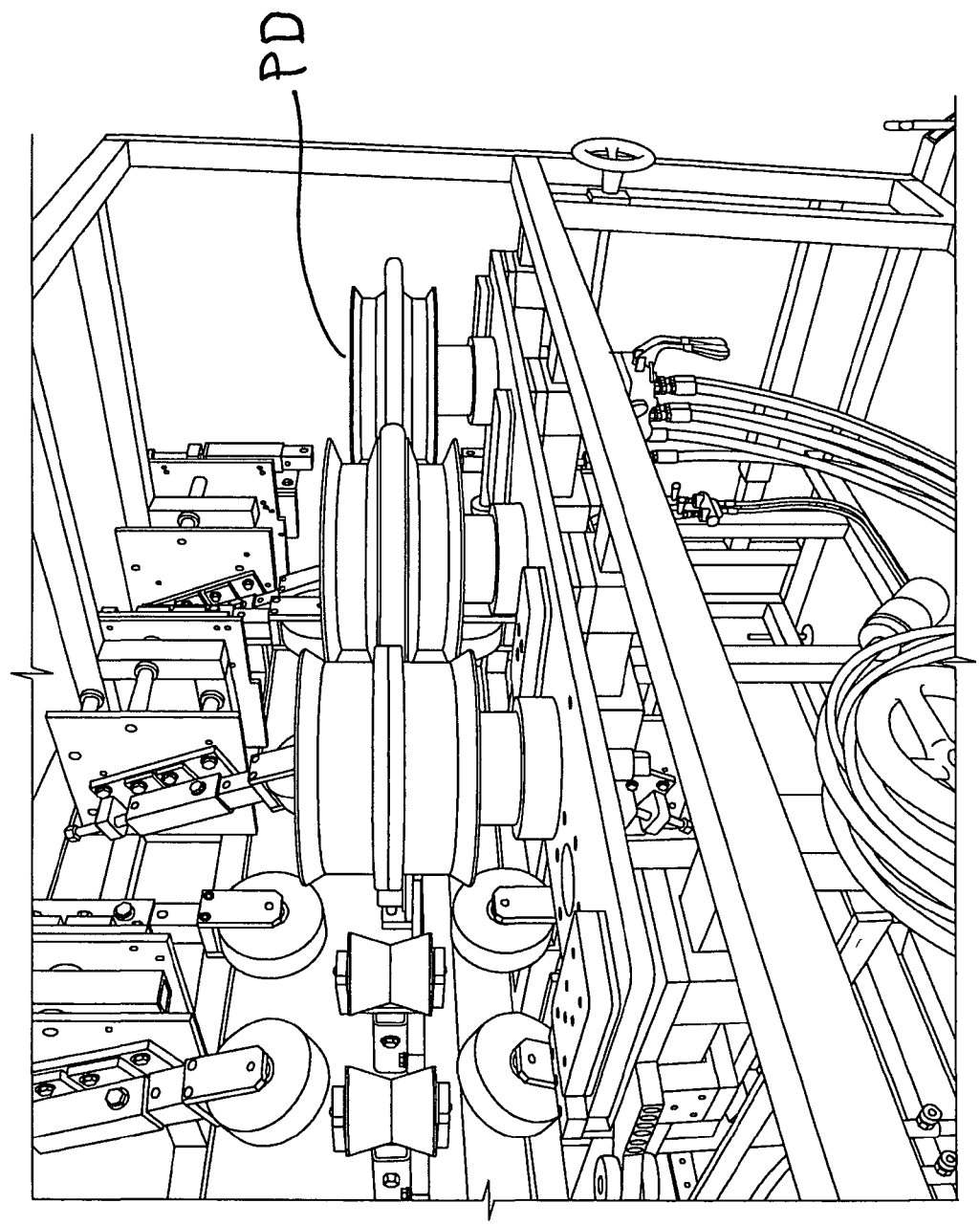
FIG. 7 is a perspective view of a step in a method according to the present invention using the system of FIG. 1.
Figure 8:
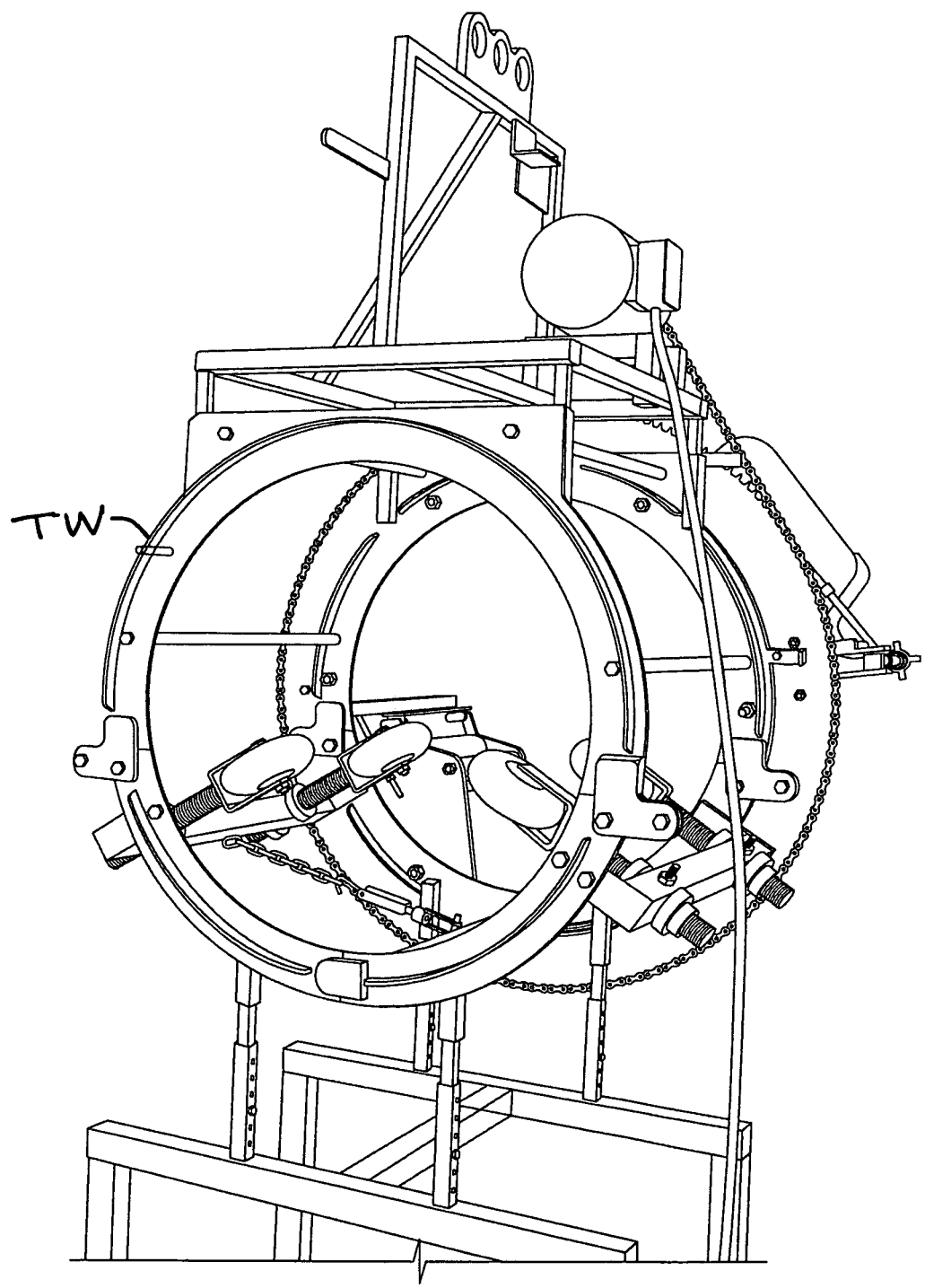
FIG. 8 is a perspective view of a step in a method according to the present invention using the system of FIG. 1.

In step 8 in the manufacturing process, so that the new pipe liner or core pipe will fit in the host pipe, the pipe liner or core pipe is mechanically deformed, e.g. with a pipe deformer PD as in FIG. 7. It is within the scope of the present invention to deform the pipe liner or core pipe in any way and into any shape to facilitate insertion into a host pipe. In one aspect, the pipe liner or core pipe is deformed into a "C" shape (see, e.g., FIG. 10) to temporarily reduce its diameter, e.g. between twenty to fifty percent and, in one particular aspect, by approximately forty percent. The pipe deformer PD conveys a mechanical force on the pipe CP adequate to change its shape, but not so much as to permanently deform it or damage it. The pipe CP moves through this deformation process at any acceptable speed; and, in one aspect, at a rate of 4 ft/min, which provides up to 1 mile of pipe daily. This step is directly related to the speed of the overall manufacturing system. The deformation of the core pipe CP is eventually reversed after installation as described below.

In step 9 (FIG. 8), following deformation, the pipe CP is quickly wrapped by a tape wrapping machine TW with tape, e.g. Mylar tape MT (see, e.g. FIGS. 9, 10) which, in one aspect is a 2-mm thick polyester film commercially available from DuPont Teijin Films (Hopewell, Va.). The Mylar tape MT holds the "C" shaped deformed core pipe CP in its deformed configuration against the thermoplastic pipe memory (see FIG. 10) in place during pipe liner or core pipe CP installation in a host pipe.

In step 10, before the pipe liner or core pipe CP enters the host pipe, a casing CG (see FIG. 9) of thin sleeve of thermoplastic film or HDPE film is wrapped around the core pipe CP. In one aspect, this casing CG has a thermoplastic film carrier and a partially cured butyl rubber adhesive backing. In one aspect, this casing CG has an HDPE carrier and a partially cured butyl rubber adhesive. It protects the core pipe CP during installation in the host pipe. In one aspect this sleeve material is commercially available material from Tek-Rap Inc. (Houston, Tex.).

Completed pipe liner or core pipe CP coming off the end of the assembly line is ready to enter a host pipe at the site of the manufacture of the core pipe and to be pulled by a pipe puller into a host pipe (or to be delivered to a work site away from the manufacturing site). Before insertion, a 20-foot section of standard HDPE pipe is pulled through a length of host pipe to verify that there are no impassable obstacles and to make sure that the new core pipe can negotiate all turns or other changes in direction within the host pipe. Bends, including 90 degree bends, can be made so long as the bend radius is not too sharp.

In certain aspects, in systems and methods according to the present invention, the system matches the speed of a pipe puller with the speed of the assembly line, accounting along the way for host pipe friction and overall tension along the length of the new core pipe. The resulting coordination among assembly line, pipe and puller is accomplished by computer(s) of the control system with computer readable media programmed with appropriate software for effecting the steps of the methods.

In one aspect, an insertion process according to the present invention begins at a terminus of the host pipe. Here, a 12×12 PLASMA (TRADEMARK) rope is attached to a pipeline pig, which is blown via air or water through the host pipe toward an initial pipe insertion entry point where the new pipe will begin. In one aspect, once delivered, the rope is woven via the long-splice method (common in fishing) to the fiber tapes on the end of the new core pipe. Pulling then begins.

At the terminus of the host pipe, a suitable spool, pulling winch, take-up winch, and trailer are used, e.g. a 35-feet-wide spool traversing on a 60-foot trailer, that winds and pulls the rope, dragging behind it the new core pipe. In one aspect a traction pulling winch that pulls the rope is rated to pull up to 500,000 lb; and the take-up winch is rated to pull up to 35,000 lb. Both of these winches are computer controlled with the control system and their speed is modulated to match production line speed. In certain aspects, a system according to the present invention can pull a total pipe weight of up to 300,000 lb, which is more than adequate to meet the needs of many applications.

Once the end of the new core pipe reaches the end of the host pipe, pulling and production are stopped. Excess pipe is cut to length and, after a couple hours of rest, the new core pipe is sealed off while pressurized air (10-15 psi) is introduced. This pressure reforms the new pipe from its deformed "C" shape to full round again, overcoming resistance from the Mylar wrap in the process. Following this, optionally, while the core pipe is still sealed, is a full hydrostatic test at operational pressure is done to verify pipe integrity and to test fiber optic function.

After all tests are complete and the new pipe is deemed functional, the core pipe ends are unsealed and connected to the host pipe and the relined section is ready to reconnect to a larger system so full pipeline operations can be resumed.

In one actual installation at a chemical production facility in the Northeast U.S. a system according to the present invention was used to replace a 60-year-old, 700-foot section of 12-inch-diameter hot water piping that had been corroded over the years by high heat and water impurities.

The installation was done over a period of two-and-a-half 12-hour days, with the actual pulling of core pipe consuming just 3 hours. In order to manufacture the core pipe, a tent was used that was 500 feet long, 25 feet wide, and 15 feet tall. The core pipe on this project was delivered to the work site ready to install, having been manufactured already at another facility a relatively short distance away. The new pipe liner was easily transported to the work site via truck. In certain aspects, up to 2,000 feet of continuous HDPE with a diameter of 6 inches can be transported by truck to a construction site.

The renewed pipeline passed required tests and functions.

In certain aspects, manufacturing and installation of new core pipe liners according to the present invention provides: an extended serviceable life of 40 to 50 years, depending on application and environment; a Hazen-Williams coefficient (water friction loss) of 150-160, compared to 75-80 for corroded steel (pipe, which means that the new piping, even though smaller in diameter due to the insertion of the core pipe, can move water more efficiently than the host pipe; new piping is compliant with API RP 15S "Qualification of Spoolable Composite Pipe"; new piping meets U.S. Dept. of Transportation (DOT) requirements for Class 3 and Class 4 lines (close proximity to humans); complete restoration of full pressure or nearly full pressure and service ratings; cost is about significantly less than the cost of total pipeline replacement, e.g., in certain aspect, 50 percent of that required to fully dig up and replace pipeline using traditional methods in a DOT class three or four area.

A method as described above, minus the deformation step and the use of a deformer is, according to the present invention, used to produce a pipe. The pipe is wrapped with HDPE material with butyl rubber (e.g. one, two, three or mroe wraps; in one aspect, two co-helical wraps) and then pulled into a ditch, a right-of way of a host pipe, or a path owned by a pipeline operator within which the pipeline is formed.

The present invention, therefore, provides in some, but not necessarily all embodiments, a pipe liner or core pipe which is suitable for insertion into a host pipe, the liner core pipe having: a pipe made of temperature-resistant corrosion-resistant material, the pipe having an outer surface, an inner surface, a first end and a second end and a flow channel therethrough from the first end to the second end; a first strengthening wrap around the pipe; an optional second strengthening wrap around the pipe; a plurality of spaced-apart axial strength members or pulling tapes positioned longitudinally on the pipe; the pipe, in one aspect, optionally deformable to facilitate insertion into a host pipe; and a protective outer wrap on the pipe for protection during insertion into the host pipe. Such a liner or core pipe may have one or some, in any possible combination, of the following: a plurality of fiber optic sensors on the pipe; wherein the sensors provide signals indicative of one of tension applied to the pipe, leaks of the pipe, movement of the pipe, and temperature along the pipe; a third wrap to secure the axial strength members or pulling tapes and sensors in place; a fourth wrap to secure the axial strength members or pulling tapes and sensors in place; wherein the pipe is made of HDPE; wherein the first strengthening wrap and the second strengthening wrap are made of high strength fabric material; wherein axial strength members are made of synthetic fiber or the the pulling tapes are carbon fiber tapes; wherein the pipe is deformable into a "C" shape; wherein the protective outer wrap is a sleeve of thermoplastic film or HDPE film; wherein the third wrap is a plurality of glass fiber tows; wherein the fourth wrap is a plurality of glass fiber tows; wherein the core pipe ranges in length up to 10 miles; wherein the liner or core pipe is made inside a protective structure, e.g., but not limited to a tent or other portable structure; wherein the protective structure is 500 feet long; and/or the core pipe having a Hazen-Williams coefficient of between 150-160. The present invention also provides methods for making a core pipe or liner; and methods for inserting a core pipe or liner into a host pipe.

Figure 11:
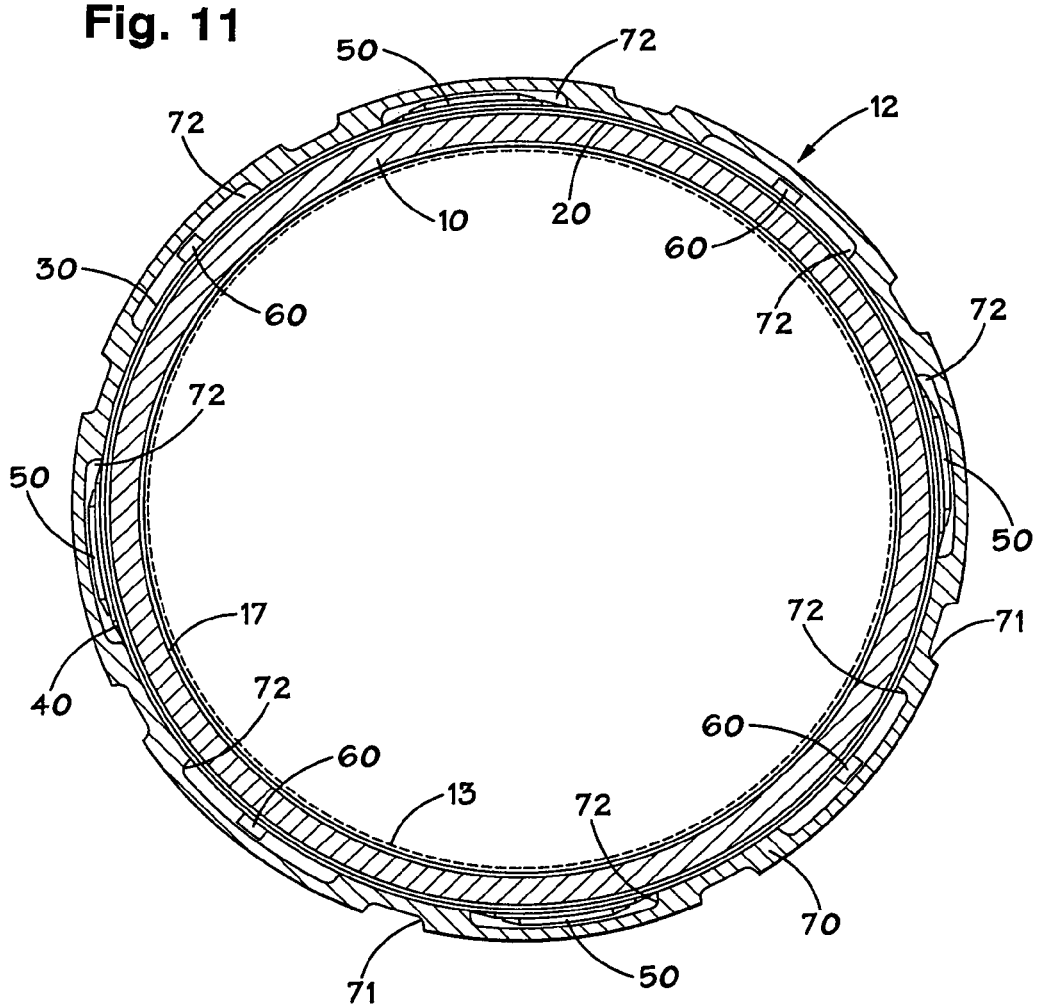
FIG. 11 is a cross-section view of a liner according to the present invention.

A pipe liner 12 according to the present invention as shown in FIG. 11 has an innermost first layer 10 (which when formed is a hollow cylinder, in one aspect, a deformable/re-formable cylinder), a second layer 20, a third layer 30, fiber strands 40, spacers 50, fiber optic cables 60, and a cover 70.

Figure 12:
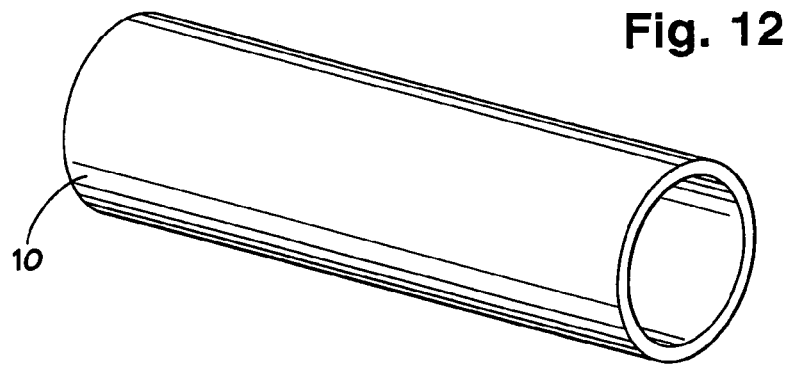
FIG. 12 is a side view of components of the liner of FIG. 11.

As shown in FIGS. 11 and 12, the first layer 10 is a generally cylindrical member made of flexible material sufficiently strong to support the other layers and components and sufficiently flexible to be compressed, deformed, and re-formed. In one particular aspect the first layer 10 is extruded HDPE (e.g. any suitable grade; e.g. PE 3408, PE4710, PE 100), with an outside-diameter-to wall-thickness ratio SDR of about 32.5 in hollow cylindrical form (and, in one aspect, not less than 7 mm in thickness). In certain aspects the lined pipe is between 4" and 30" in O.D. and, in other aspects, the pipe that is lined is standard size (iron pipe size or IPS) and has an O.D. between 6⅝" and 16". In one particular aspect, fifty foot lengths of such first layers are commercially available. In certain aspects a fluid-resistant thermoplastic material is used for the first layer that resists fluids being transported through a pipeline or pipe. NYLON 6 (TRADEMARK) material, RILSAN (TRADEMARK) material, or NYLON 11 (TRADEMARK) material or other suitable thermoplastic material may be used for the first layer. In addition to HDPE, Cross-linked HDPE, PEX, PIPELON Nylon (TRADEMARK) material, RILSAN (TRADEMARK) material, or NYLON 11 (TRADEMARK) material or other suitable thermoplastic material may be used for the first layer.

In certain embodiments, lengths of the first layer 10 are welded together on-site at a location at which the liner 12 is to be installed within a pipe or pipeline. In one aspect the lengths of the first layer 10 are butt fusion welded and, while the welds are still hot, weld beads are smoothed out and/or removed from outside the layer 10 and, optionally, from inside. Optionally, the welded area is tested on-site for integrity, e.g., but not limited to, with known ultrasonic testing apparatus.

Figure 13:
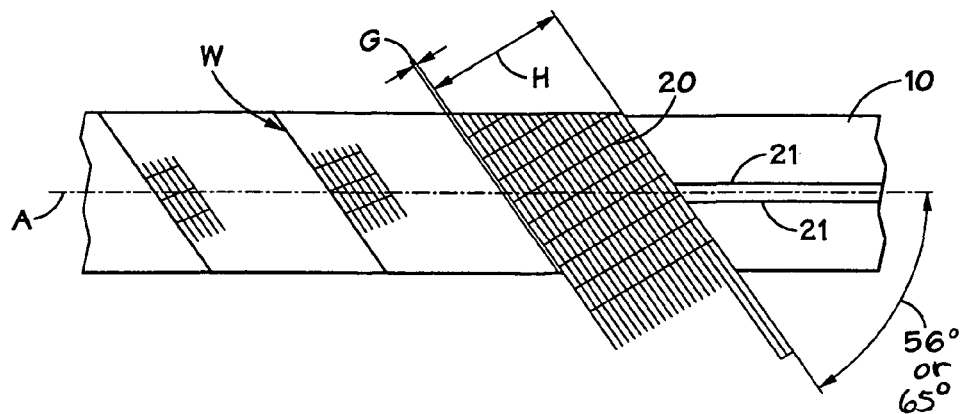
FIG. 13 is a side view of components of the liner of FIG. 11.

As shown in FIGS. 11 and 13, the first layer 10 is wrapped with the second layer 20 which is a layer of material for strengthening the liner 12. Suitable materials for the second layer 20 include fabric with highly oriented KEVLAR (TRADEMARK) material; HMPE fibers ("HMPE": high molecular weight polyethylene); SPECTRA (TRADEMARK) material; KEVLAR (TRADEMARK) material; ARAMID (TRADEMARK) material; VECTRAN (TRADEMARK) material; liquid crystal polymer ("LCP") material; DYNEEMA (TRADEMARK) material; TWARON (TRADEMARK) material; TECHNORA (TRADEMARK) material; fiber-reinforcing material, e.g. VECTRAN (TRADEMARK) material carbon fibers, fiberglass fibers and/or hybrid fibers; fabric made from carbon fibers and/or glass fibers; and fabric made from carbon fibers and SPECTRA (TRADEMARK) fibers. In certain particular aspects, SPECTRA (TRADEMARK) material, commercially available from Honeywell Company is used because it has a weight-to-volume ratio of 0.035 lbs/in$^3$. In certain particular aspects, commercially available, and in one aspect, hybridized with liquid crystal polymer material or para-aramid material is used which has a weight-to-volume ratio of 0.051 lbs/in$^3$. In one aspect, such a fabric is formed which is 20% to 50% VECTRAN (TRADEMARK) material with better creep resistance than SPECTRA (TRADEMARK) material. In certain particular aspects, commercially available carbon-fiber reinforced material is used which has a weight-to-volume ratio of 0.051 lbs/in$^3$. The thickness of layers 20 and 30, in certain aspects, ranges between 0.010 and 0.240 inches and in one particular aspect is 0.024 inches. In one aspect the layer 20 and/or the layer 30 are highly oriented high molecular weight polyethylene ("HMWPE").

To provide hoop strength, the second layer 20 is wrapped around the first layer 10, in certain aspects at a wrap angle (or wind angle) between 45 degrees and 70 degrees. In other aspects this wrap angle is between 50 degrees and 60 degrees or between 60 and 70 degrees and, in certain particular aspects, this angle is 54.7 degrees or 65 degrees. As shown in FIG. 13, the wind angle is designated "plus" to indicate its orientation with respect to a longitudinal axis A of the layer 10 and the wind angle is 56 degrees. Edges of each wrap are butted up against edges of adjacent wraps so no part of the second layer overlaps itself (see, e.g. butting up indicated by arrow W, FIG. 13). Alternatively, a minimal overlap is used; or there is a gap G as shown in FIG. 13. Each wrap of the layer 20 has a width H. Optionally, one, two, three, four, five, six, seven, eight or more heated pressure rollers are applied on the liner 10. Optionally, one, two, three, four, five, six, seven, eight or more tapes, strips, or lines of adhesive or glue 21 are applied on the liner 10. It is to be understood that the entire layer 20 can, according to the present invention, be wrapped around the layer 10 with no gap between wrap edges; with an overlap of some edges; with a gap between all adjacent wrap edges; or with a combination of gap between some edges, overlap of some edges, and/or no gap between others. In certain aspects in which the layer 20 (and/or the layer 30 discussed below) have unidirectional (oriented at the same angle or in the same direction) fibers, the layer 20 is applied so that the fibers are oriented generally at an angle to the longitudinal axis A, in one aspect, at the same angle as the wind angle. By employing no such overlap, overall effective diameter of the liner 12 is reduced. Alternatively, the second layer 20 is wrapped with space between adjacent wrap edges, rather than butting edges against each other which also results in no overlap. In some such aspects, space between adjacent wrap edges is no more than 3% of the total liner surface area.

Figure 16:
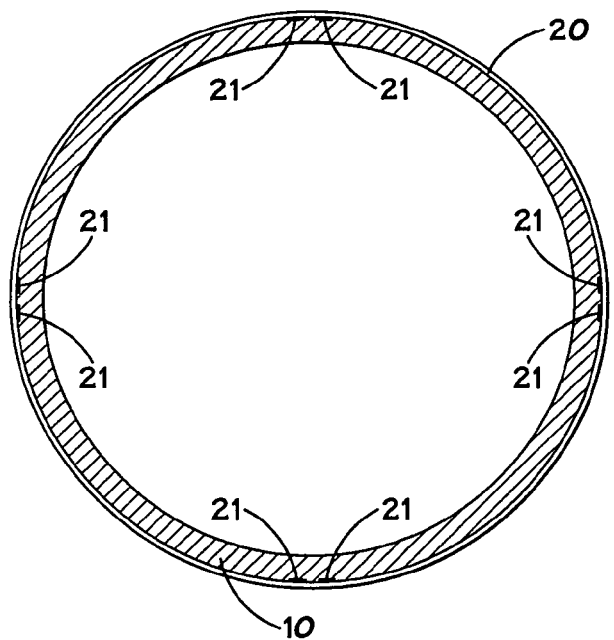
FIG. 16 is a cross-section view of components of a liner as in FIG. 15.

Optionally, as shown in FIGS. 13 and 16, one or more hot pressure rollers may be applied to the first layer 10 to locally bond it, either intermittently or from one end of the first layer 10 to the other, either in straight lines (as shown) or wrapped around the first layer 10, to inhibit or prevent slippage of the second layer 20 on the first layer 10. Optionally, as shown in FIGS. 13 and 16, one or more lines or strips of glue, adhesive, or tape 21 may be applied to the first layer 10, either intermittently or from one end of the first layer 10 to the other, either in straight lines (as shown) or wrapped around the first layer 10, to inhibit or prevent slippage of the second layer 20 on the first layer 10. In an embodiment in which SPECTRA (TRADEMARK) fiber material is used with axial carbon fibers, these lines 21 tie the axial carbon fibers to the SPECTRA (TRADEMARK) fibers so the two function at the same strain rate which allows the carbon fibers to strengthen the fabric. In certain aspects a commercially available modified cyanoacrylate type of glue is used, from Loctite Company for the lines 21. As shown in FIG. 16, eight lines 21 are used; but any desired number (e.g. 1, 2, 3, 5, 10, etc.) may be used. In one aspect the lines 21 are sprayed on. In certain aspects the lines 21 (and 31) are applied so that the liner 12 is still sufficiently flexible that it can be deformed and re-formed as desired. In one aspect two, three, four, five or more pairs of two lines are used spaced apart around the circumference.

Figure 14:
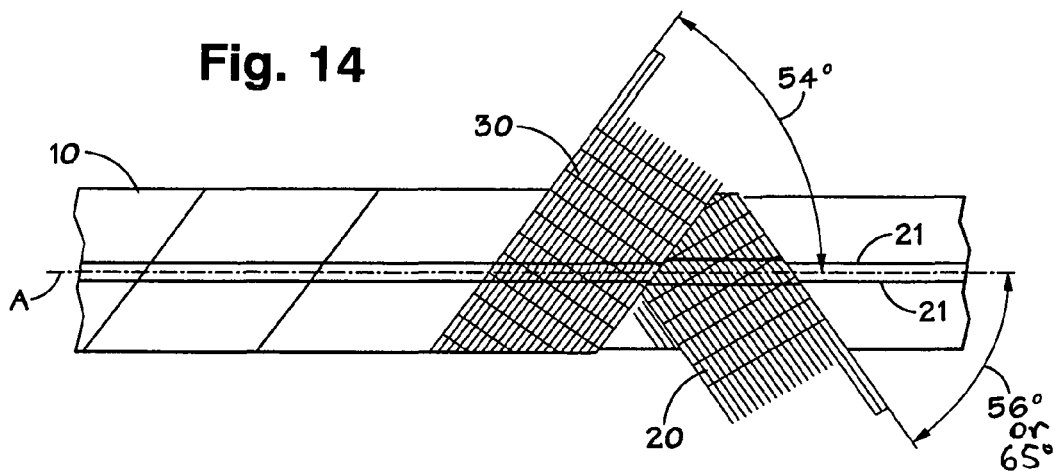
FIG. 14 is a side view of components of the liner of FIG. 11.
Figure 17A:
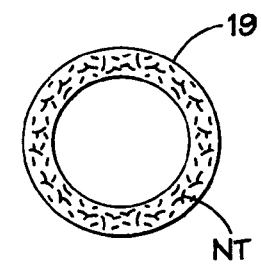
FIG. 17A is a cross-section of a liner layer.
Figure 17:
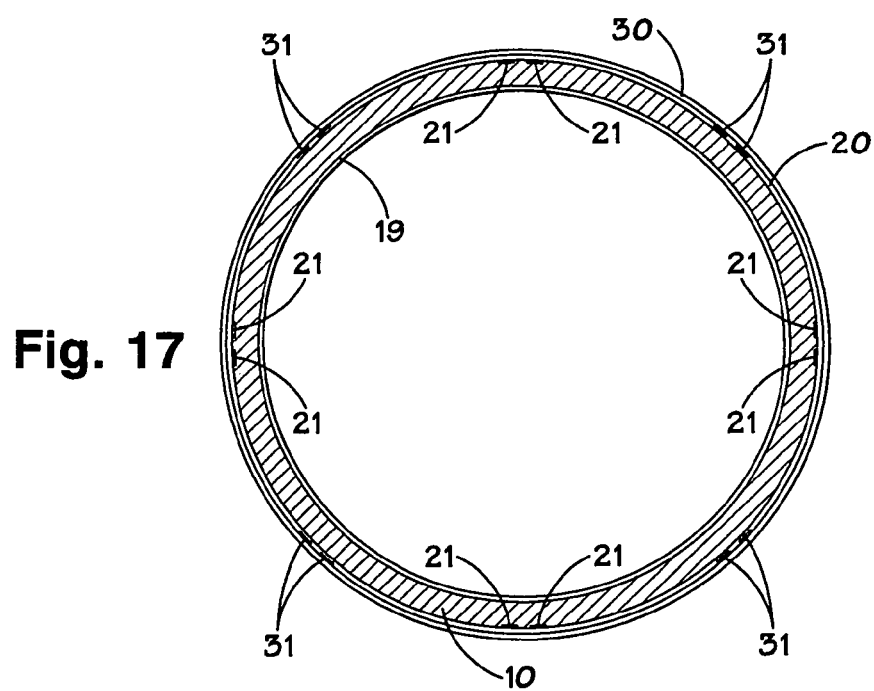
FIG. 17 is a cross-section view of components of a liner as in FIG. 15.

As shown in FIGS. 11, 14 and 17 the third layer 30 is wrapped over the second layer 20 and may be wrapped in any of the ways described for the second layer 20 and may be material as described for the second layer 20, with or without lines, etc. 21 on the layer 20 as described for the layer 10. In one aspect both the second layer 20 and the third layer 30 are VECTRAN (TRADEMARK) material about 0.024 inches thick. In one aspect both the second layer 20 and the third layer 30 are SPECTRA (TRADEMARK) material about 0.024 inches thick. In certain aspects the third layer 30, as shown in FIG. 14, is wrapped at a wrap angle opposite to that of the second layer 20 (designated "minus" to illustrate its orientation with respect to the axis A and in a direction opposite to that of the layer 20; and, as shown at a wind or wrap angle of minus 54 degrees or of minus 65 degrees) provides hoop strength. Also, as shown in FIG. 17 (not to scale) in an end view, lines 31 (like the lines 21) may be used between the second layer 20 and the third layer 30.

Figure 15:
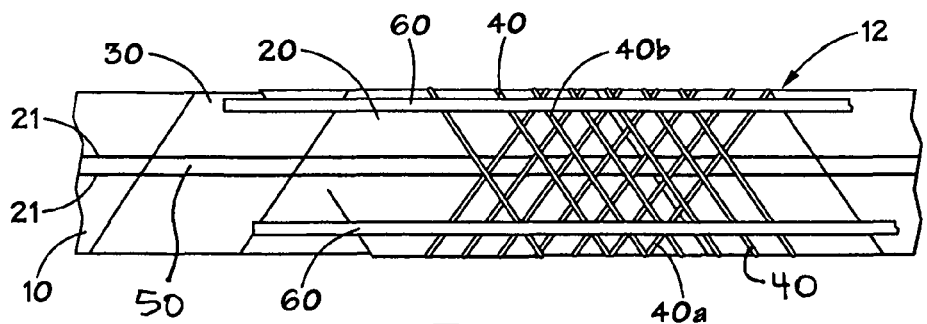
FIG. 15 is a side view of components of the liner of FIG. 11.

As shown in FIGS. 11 and 15, one, two, three, four, or more tapes 40 are used of thermoplastic film backed with a partially cured rubber adhesive, e.g. wound on the third layer 30 (and/or on the layer 20 and/or on the tapes 50) to tie the components of the pipe liner together thus strengthening the liner 12 and to facilitate its integrity while it is being pulled into a pipeline. These tapes provide between 30 and 100% coverage of the surface area. Optionally, one, two, three, four, five twenty, thirty, thirty six, forty or more fiber strands (or "tows") 40 are used, e.g. wound on the third layer 30 (and/or on the layer 20 and/or on the tapes 50) to strengthen the liner 12 and to facilitate its integrity while it is being pulled into a pipeline. Any suitable fiber may be used. It is within the scope of the present invention to apply strands or tows 40 at different wind angles on a liner 12. Strands 40a are at a plus wind angle and strands 40b are at a negative wind angle.

In certain particular aspects the strands 40 are commercially available fiber tows, which are wound on the liner 12. With the fibers 40 glued or otherwise adhered in place, the fibers 40 and the remaining components form a single integral body which can react to and withstand strain so that creep (undesired movement) of the third layer 30 is reduced and axial loads on the liner 12 are partially absorbed by the tapes 50 thereby reducing strain on the other layers.

Figure 18:
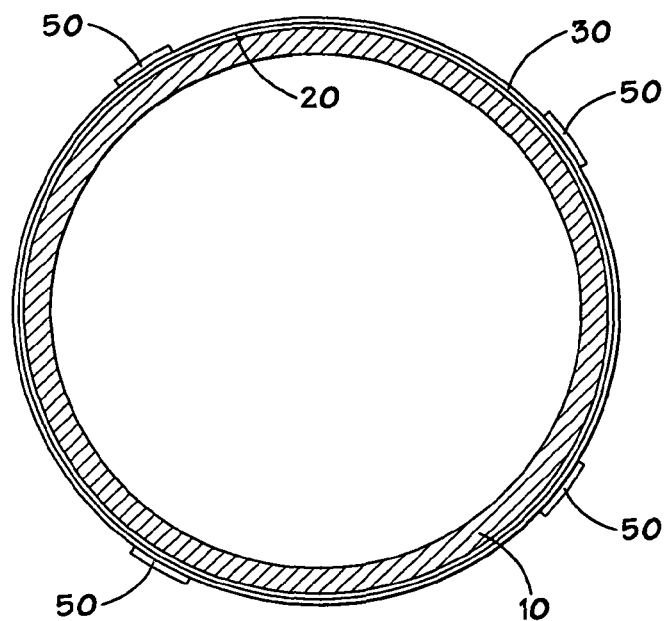
FIG. 18 is a cross-section view of components of a liner as in FIG. 15.
Figure 19:
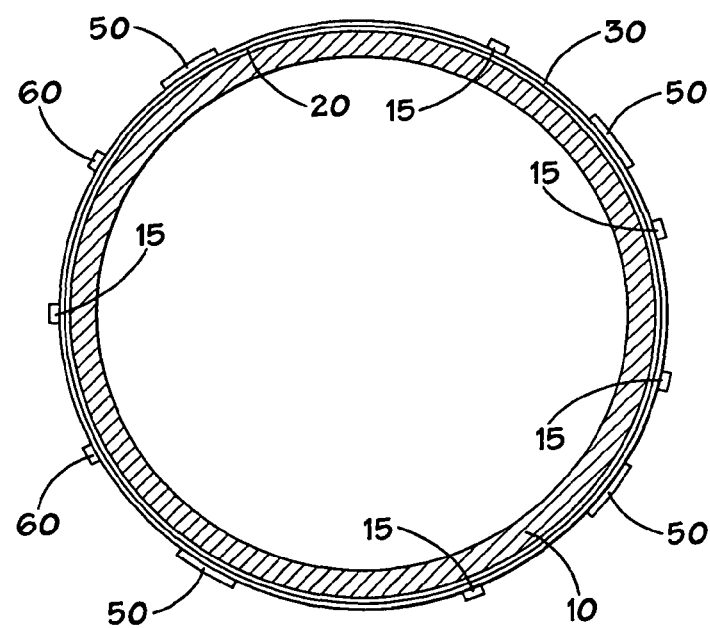
FIG. 19 is a cross-section view of components of a liner as in FIG. 15.

Optionally, as shown in FIGS. 11, 15 and 18, axial strength members or pulling tapes 50 (or socks or tubes) (or stacks of two, three or more members or tapes 50) may be applied to the third layer 30. These members or tapes 50 also enhance the axial strength of the pipe-liner and the ability of the liner 12 to be pulled into a pipeline. Optionally, one or some strands 40 are applied over the layer 20, over the layer 30, and/or over the tapes 50. The strands 40 when used over the members or tapes 50 tie the tapes 50 to the lower layers. In one particular aspect a first tape (or member) or first tapes (or members) 50 are applied on the layer 30 then a layer of strands 40 (described below) ties the members or tapes 50 in place. Then one or more additional tapes 50 is applied over the strands 40 and additional (one or more) strands 40 tie the additional tapes 50 in place. These tapes 50 also enhance the ability of the liner 12 to be pulled into a pipeline. In one particular aspect the tape 50 is VECTRAN (TRADEMARK) fiber tape, about 1.50 inches wide, about 0.040 inches thick, and eight such tapes 50 are used equally spaced around the circumference of the liner and extending in straight lines from one end thereof to the other (or 4 pairs of 2 tapes stacked one on the other are used). In one particular aspect the tape 50 is carbon fiber tape, about 1.50 inches wide, about 0.040 inches thick, and eight such tapes 50 are used equally spaced around the circumference of the liner and extending in straight lines from one end thereof to the other (or 4 pairs of 2 tapes stacked one on the other are used). The members or tapes 50 (and the fibers 40) can be equally spaced around the liner circumference or not; e.g. FIGS. 18 and 19 show a cross-section view with particular spacing for the tapes 50. The spacing for the tapes 50 as shown in FIG. 19 facilitates the maintenance of a folded liner 12 (insertable into a pipe or pipe line) in a general "C" shape as described below (see FIG. 14).

As shown in FIGS. 11 and 19, fiber optic cables 60 (one, two, three, four, five, six, or more) are applied on the Wrap 30 adjacent to the axial strengthening and/or pulling tapes. Optionally, fiber optic cables 60 (one, two, three, four, five, six, or more) are applied on the fibers 40. It is within the scope of the present invention to apply the fiber optic cable(s) to the layers 10, 20, and/or 30 and/or on the tapes 50 and/or beneath a cover like the cover 70. Any known suitable fiber optic cables may be used, including SmartProfile (TRADEMARK) cables from Smartec S/A Company. In one particular aspect a SmartProfile (TRADEMARK) fiber optic cable 61 is used as shown in FIG. 20 which has a body 62, e.g. made of HDPE which encases two or at least two fiber optic cables 63, 64 in filler material 69 within a central space 65 and two or at least two additional fiber optic cables 66, 67. Either or both of the cables 63, 64 is used to measure temperature on the liner 12 and either or both of the cables 66, 67 are used to measure strain. The temperature measurements provide information regarding leaks in the liner 12 both regarding the existence of a leak and its location (temperature and strain measurements are done in prior art systems with cables on the outside of a pipe, e.g. a steel pipe). Either cable 63 or 64 may be deleted; but providing two such cables provides redundancy in the event one of them fails.

FIG. 21A shows schematically a system 100 according to the present invention for receiving, processing, and transmitting information based on the signals from fiber optic cables. A pipeline (or pipe) 110 has a liner 112 (like the liner 12 described above or like any liner according to the present invention) with a fiber optic system 114 as described above with fiber optic cables 160 (like the cables 60 described above). The pipeline 110 has a variety of pipeline-associated devices and apparatuses 104 (two shown schematically), each with an operator or controller 106. In one particular aspect, the pipeline 110 has a plurality of apparatuses 104 which are valves that selectively control the flow of fluid through the pipeline and each valve has a controller 106 which is in operational communication with the fiber optic system 114. A measurement system 120 provides a communications interface between the pipeline 110 and a control system 130 (e.g. a pipeline operator's control room with a SCADA system 136). The SCADA system 136 includes a computer system 138 which receives digitized signals from the system 120 which has converted the analog signals from the pipeline 110 into digital form) indicative of temperature and/or strain along the length of the pipeline 110. Either the system 120 or the system 138 has a programmable medium programmed to note an anomaly or spike in either temperature or strain or both. Such an anomaly or spike can indicate a potential leak (temperature spike) or a potential overstress condition or impending liner failure (strain spike) in the pipeline 110. In one aspect the system 130 activates an alarm or alarm system 140 when an alarm value for temperature, strain or both is reached. In one particular aspect, each of the apparatuses 104 is a pipeline valve; an alarm is provided by the system 140 in response to signals from the system 114 (temperature or strain or both measured and indicating a leak at a location between the valves 104), 120, 130; controllers 106 on each valve 104 are activated to close both valves 104; and both valves 104 are closed, isolating the length of the pipeline 110 between the valves.

Figure 21B:
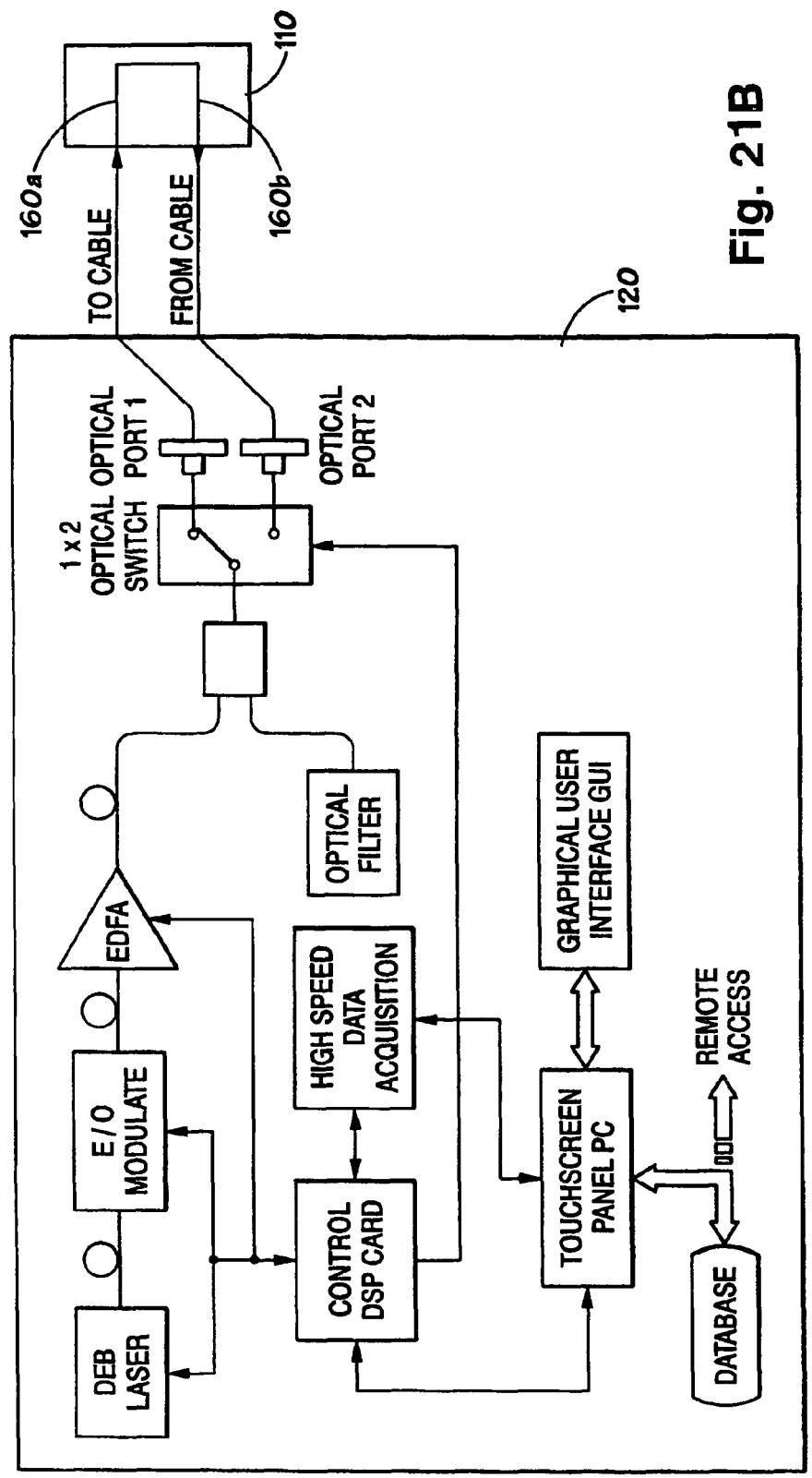
FIG. 21B is a schematic drawing of a system used with liners according to the present invention.

FIG. 21B illustrates schematically one particular embodiment of a system 120 (e.g. a commercially available Model DiTest Model STA 201 from Smartec S/A company) connected to a pipeline 110. Fiber optic cables 160a, 160b are looped as shown or terminated with a reflective end (as may be done with any cable of any system herein). In one aspect, instead of looping the cable, a mirror is provided at the end of the cables 160a, 160b for beam bounce back in the same cable. As shown in FIG. 21B, the prior art measurement system 120 is, according to the present invention, used with the pipeline 110. The measurement system 120 sends a signal (e.g. a laser beam) to and through the upper (as shown in FIG. 21B) fiber optic cable 160a and receives a signal back through the lower (as shown in FIG. 21B) fiber optic cable 160b. The system 120 inputs signals into the fiber optic cables; monitors the return signals; processes the return signals (including A/D conversion); produces digital signals indicative of measured parameters (temperature and/or strain of the pipeline 110) e.g. temperature sensitivity within 4° F. and/or strain sensitivity within 0.002%.

It is old and well-known to use grooves or recesses 71 in a cover 70 as shown in FIG. 11 (see, e.g. U.S. Pat. No. 6,220,079). Optionally, a cover 70 according to the present invention as shown in FIG. 11 may have one, two, three, four, five, six, seven, eight or more interior grooves or recesses 72. Such grooves or recesses are used within a pipeline lined with a pipe liner 12 to provide a space to hold gases from the fluid flowing through the pipeline which permeate through layers of the liner 12.

Figure 22:
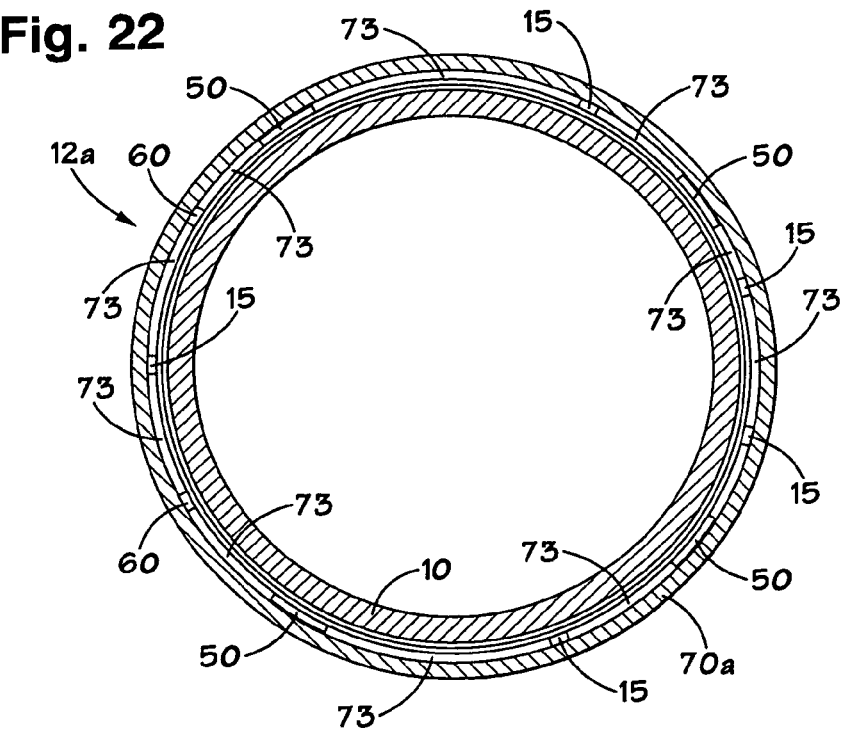
FIG. 22 is a cross-section view of components of a liner as in FIG. 15.

Optionally, according to the present invention, a cover 70 is provided with no grooves 71 and with no grooves 72. As shown in FIG. 22 a pipe liner 12a (like the pipe liner 12) has one, two, three, four, five, six, seven, eight or more spacers 15 (two shown) over which is applied a cover 70a. The cover 70a has no grooves, interior or exterior, and spaces 73 formed adjacent the spacers 15 provide a volume that can be entered to vent accumulated gases. Alternatively, one or more grooves like the grooves 72 and/or like the grooves 71 may be used with the liner 12a. Optionally (as is true for the liner 12) the spacers 15 may be deleted. Optionally, one or two layers of material (e.g., but not limited to, polyethylene material or rubber) are orbitally wound to form the cover 70 or the cover 70a.

Figure 23:
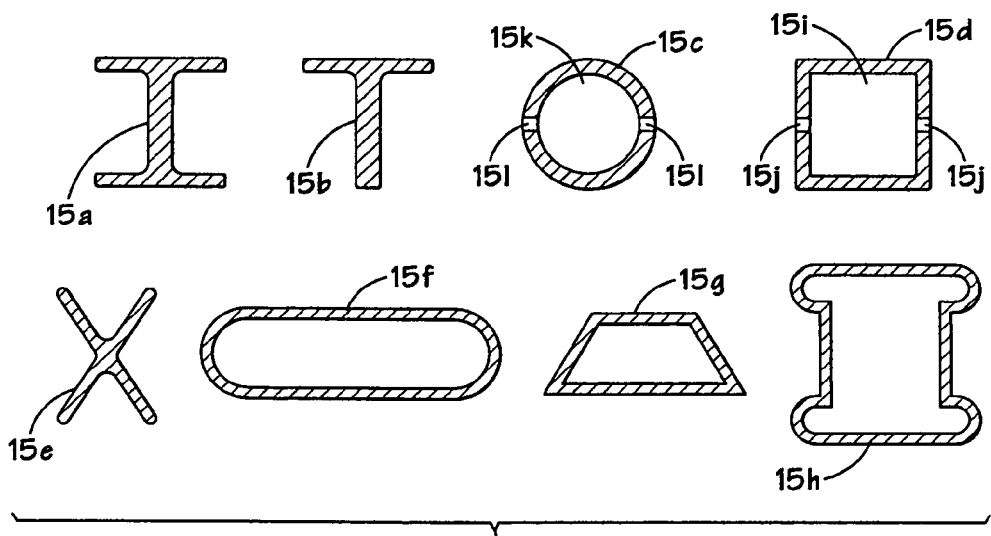
FIG. 23 shows shapes for spacers according to the present invention.

As shown in FIG. 23, the spacers 15 may be any desired shape (shapes 15a-15h shown in cross-section) and they may be made of any material, including, but not limited to metal, metal alloys, non-conducting metals, non-conducting metal alloys, plastic, wood, fiberglass or composite. Any hollow spacer may have a hollow interior, e.g., interiors 15i, 15k, and one or more vent holes, e.g., holes 15j or 15l.

When gases permeate a liner 10 and enter into grooves 71, grooves 72 and/or spaces 73, this accumulated gas is removed from the spaces adjacent the grooves or from the spaces 73, e.g. by vacuuming from ports provided along a pipe or pipe line. Such gas permeation is reduced, according to certain embodiments of the present invention, by co-extruding with the first layer 10 a thin layer 17 (shown partially, FIG. 11; encompasses entire length and circumference of the pipe or pipeline) of impermeable material (e.g. 0.060 inches thick) which is on the wetted side (an interior side) of the first layer 10 and serves as a pressure barrier. In one aspect this layer 17 is EVOH (ethylene vinyl alcohol copolymer) or NYLON (TRADEMARK) material. In another aspect, to reduce gas permeation, a thin layer 19 (see FIG. 17; e.g. 0.060 inches thick) of HDPE is co-extruded with the first layer 10. The layer 19 has a plurality of functionalized single wall nano tubes throughout the layer 19 which both inhibit gas permeation through the first layer 10 and which strengthen it. In one aspect, by volume, between about 1% to 5% of a layer is made of these nano tubes; and in one particular aspect about 2%.

In certain materials and certain ballistic materials, e.g. the SPECTRA (TRADEMARK) material creeps (i.e., elongates under loading) which can result in a loss of strength of an overall layer. To strengthen such layers and to reduce creep therein, a plurality of functionalized single wall nano tubes is added to the second layer 20 and/or to the third layer 30 (and/or to any other layer or component). Using functionalized nano tubes from NanoRidge Materials, Inc. results in substantially no increase in weight of a layer or of a component, e.g. of a layer 20 or a layer 30 due to their small size. In certain aspects, by volume these nano tubes are about 1% to 5% of a component or of a layer's total volume and, in one particular aspect, are about 2% of this total volume.

In one aspect, the liner or core pipe, 10 is aluminized or covered with a thin (001 to 005-mils thick) film of aluminum to reduce and/or eliminate permeation through the extruded liner or core pipe. In another aspect, the extruded liner or core pipe contains from 0.1 to 10 weight percent of functionalized carbon nanotubes which also reduce or eliminate permeation through the core pipe.

In certain aspects for the layers 10, 20, 30 a mixture of fibers can be used instead of using only a single material, e.g. VECTRAN (TRADEMARK) material or only SPECTRA (TRADEMARK) material fibers. For example, carbon fibers (20% to 50% by volume) can be mixed with SPECTRA (TRADEMARK) fibers; in one aspect, to reduce creep.

Figure 24:
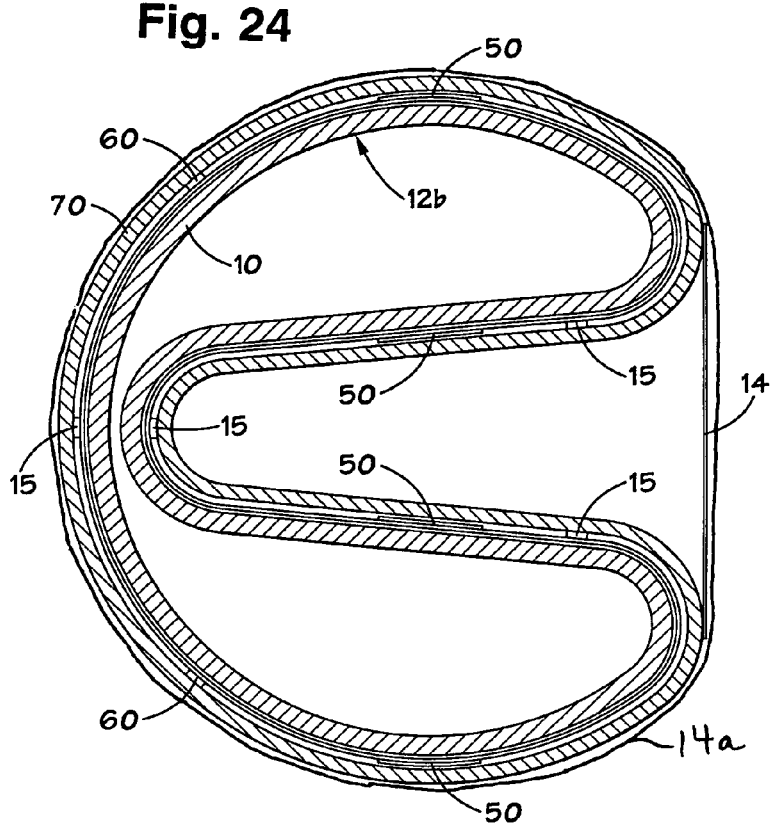
FIG. 24 is a cross-section view of components of a liner as in FIG. 15.

FIG. 24 illustrates a liner 12b (e.g. as a liner 12a in FIG. 22; and like numerals indicate like parts) which has been folded or deformed into the general "C" shape shown in FIG. 24. The liner 12b is folded, and the axial strength members or pulling tapes 50 are positioned, so that in the folded configuration shown in FIG. 24 a plurality of members or tapes 50 are generally aligned with each other. With the four members or tapes 50 as positioned in FIG. 24, pulling of the liner 12b into a pipe or pipeline is facilitated by attaching and pulling at the location of each tape 50. It is within the scope of the present invention to provide one, two, three, four, five, six, seven, eight or more tapes like the tapes 50 aligned on a deformed liner which is deformed into any shape.

As shown in FIG. 24, according to the present invention a liner may have spacers 15 which are located so that they support the cover and/or provide channel(s) for the collection of permeated fluids. In one particular aspect as shown, the spacers 15 provide uniform support for the cover without limiting the ability to deform the liner 12.

Optionally, a tape 14 may be used to maintain the liner 12b in its deformed shape as shown in FIG. 24. The tape 14 may be wound over the outer surface of the liner 12b in a continuous path to hold the deformed liner in the configuration shown. The tape 14 may be glued, bonded, or adhered to the outer cover of the liner 12b at multiple points to hold the deformed liner in the configuration shown. Optionally a tape 14a is used over the tape 14. In one aspect, the tape 14a is polyethylene tape or adhesive tape. Any suitable material may be used for the tape(s) 14 (and/or tapes 14a); e.g., adhesive tape; duct tape; polyethylene tape; MYLAR (TRADEMARK) material or a foil or plastic strip whose ends are glued, bonded or adhered to the liner. Such a tape or tapes 14 (and/or tapes 14a) may be used with a liner deformed into any shape to maintain that shape during a liner installation procedure and/or for handling outside a pipe or pipeline prior to such installation. Upon initiation of re-forming of the liner to a full expanded configuration, the tape(s) 14 (and/or 14a) breaks relatively easily.

Figure 25:
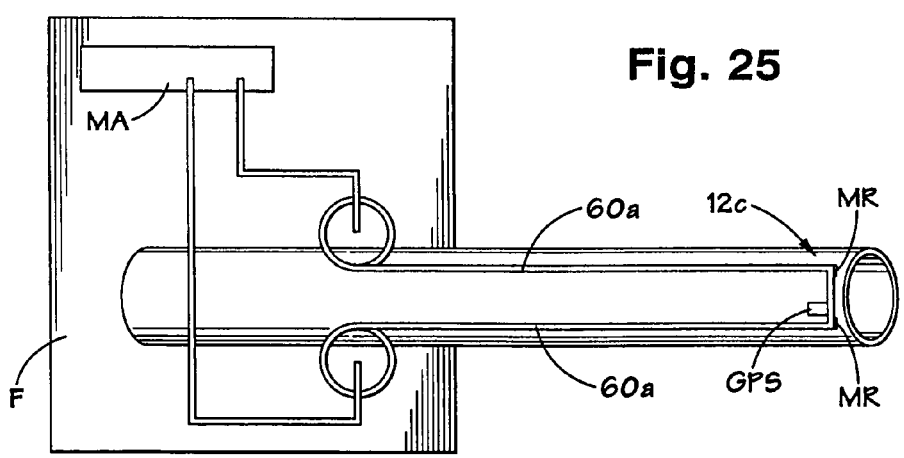
FIG. 25 is a schematic view of a method for producing a liner according to the present invention.

FIG. 25 illustrates schematically a method according to the present invention for producing a pipe liner 12c according to the present invention which has fiber optic cables 60a (like the fiber optic cables 60 or any fiber optic cables described above) which are applied to the liner 12c as the liner 12c is being made to monitor installation effects, e.g. location in a host pipe and/or applied tension. As the liner 12c exits a liner making machine in a production system F, a system MA (e.g. like the system 120 described above) is in communication with the fiber optic cables (as the system 120 is in such communication as described above). By employing mirrors MR at the distal end of the fiber optic cables and/or by using a GPS sensor apparatus GPS (which emits a GPS locator signal transmitted through the fiber optic cables) at the end of the liner 12c, the system MA can determine the distance from the end of the liner 12c at the machine exit to the distal end of the produced liner, thereby providing a measurement of the length of the produced liner 12c. Strain, if there is any on the liner 12c as it is produced is measured providing a measure of the pulling force. Similarly, using a system MA during a liner installation procedure, a measurement is provided which indicates the length of liner installed within a pipe or pipe line; and, in one aspect, a measurement of a strain on a liner as it is pulled into a pipe or pipe line. Any pipe or pipeline herein may have a fiber optic cable or cables with a mirror MR and/or a GPS apparatus as described above.

The present invention, therefore, provides in some, but not in necessarily all embodiments a pipe including: a host pipe; a pipe liner, the pipe liner including a base pipe made of temperature-resistant non-metallic corrosion-resistant material, the pipe base having an outer surface, an inner surface, a first end and a second end and a flow channel therethrough from the first end to the second end a first strengthening wrap around the base pipe, an optional second strengthening wrap around the base pipe, a plurality of spaced-apart axial strength members positioned on the base pipe (e.g., longitudinally), and a protective outer wrap on the second strengthening wrap; and, optionally, a plurality of axial strength members on the protective outer wrap. Such a pipe (or pipeline) may have one or some, in any possible combination, of the following: wherein the pipe liner is of a continuous length produced in-situ at a site of a host pipe; wherein the pipe liner is deformed and is held in a deformed shape (e.g., but not limited to, a "C" shape) during installation in the host pipe; a plurality of fiber optic sensors positioned on the base pipe; wherein the sensors provide signals indicative of one of tension applied to the pipe, leaks of the pipe, movement of the pipe, and temperature along the pipe; a third wrap to secure the axial strength members and/or sensors in place; a fourth wrap to cover the third wrap; wherein the base pipe of the pipe liner is made of thermoplastic material; wherein the first strengthening wrap and the second strengthening wrap are fabric material made of high strength synthetic fibers; wherein the axial strength members are unidirectional tapes made of synthetic fibers; wherein the base pipe is deformable into a "C" shape; wherein the protective outer wrap is adhesive backed thermoplastic tape; wherein the axial strength members are pulling tapes; wherein the pipe (or pipe line) and the pipe liner range in length up to 10 miles; wherein the pipe liner is made inside a protective structure; wherein the protective structure is a temporary structure; wherein the protective structure is 500 feet long and about 25 feet wide; and/or the base pipe having a Hazen-Williams coefficient either between 150 and 160.

The present invention, therefore, provides in some, but not in necessarily all embodiments a pipe liner which is suitable for insertion into a host pipe, the pipe liner including: the pipe liner is a stand-alone continuous length high-pressure non-metallic liner produced in-situ at a site of a host pipe; a base pipe made of temperature-resistant non-metallic corrosion-resistant material, the base pipe having an outer surface, an inner surface, a first end and a second end and a flow channel therethrough from the first end to the second end; a first strengthening wrap around the base pipe; a second strengthening wrap around the base pipe; a plurality of spaced-apart axial strength members positioned longitudinally on the base pipe; a plurality of fiber optic sensors on the base pipe; wherein the sensors provide signals indicative of one of tension applied to the pipe, leaks of the core pipe, movement of the pipe, and temperature along the pipe; a third wrap to secure the axial strength members and sensors in place; a fourth wrap on the third wrap; the pipe liner ranging in length up to 10 miles; and the pipe liner made in-situ inside a protective temporary structure. Such a pipe liner may also have a protective outer wrap on the base pipe for protection during installation of the pipe liner.

The present invention, therefore, provides in some, but not in necessarily all embodiments a method for making a pipe liner suitable for installation into a host pipe, the method including: welding together a plurality of pieces to form a base pipe, the base pipe is a temperature resistant non-metallic corrosion-resistant material made in-situ at a use site, the base pipe having an outer surface, an inner surface, a first end and a second end and a flow channel therethrough from the first end to the second end; wrapping the base pipe with a first strengthening wrap; wrapping the base pipe with a second strengthening wrap; securing a plurality of axial strength members on the base pipe; deforming the base pipe to facilitate insertion thereof into a host pipe; and wrapping the base pipe following deforming with a plurality of members to maintain the pipe in a deformed shape during insertion into a host pipe.

In conclusion, it is seen that the present invention and the embodiments disclosed herein and those covered by the appended claims are well adapted to carry out the objectives and obtain the ends set forth. Certain changes can be made in the subject matter without departing from the spirit and the scope of the invention. Changes are possible within the scope of this invention. Each element or step recited in any of the claims is understood as referring to the step literally and/or to all equivalent elements or steps. The claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine the scope of the invention and of the claims that follow as they may pertain to things not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. The word "comprising," used in its non-limiting sense, means that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A pipe comprising
   a host pipe,
   a pipe liner, the pipe liner including
      a base pipe, the base pipe comprising a new pipe made of temperature-resistant non-metallic corrosion-resistant material, the base pipe having an outer surface, an inner surface, a first end and a second end and a flow channel therethrough from the first end to the second end,
      the base pipe comprising a plurality of individual pipe sections connected together,
      a first strengthening wrap around the base pipe,
      a second strengthening wrap around the base pipe,
      a plurality of spaced-apart axial strength members positioned on the base pipe,
      a protective outer wrap on the second strengthening wrap, and
      the base pipe comprising a stand-alone replacement for use within a damaged host pipe,
      the base pipe having a wall thickness of between about 4 mm and 7 mm, and
      without the application of energy to the pipe liner before or after installation thereof in the host pipe.

2. The pipe of claim 1 wherein the plurality of individual pipe sections of the base pipe are welded together.

3. The pipe of claim 1 wherein the plurality of individual pipe sections of the base pipe are butt fusion welded together end-to-end using a fusion welding machine.

4. The pipe of claim 1 wherein each of the plurality of individual pipe sections is an extruded cylinder.

5. The pipe of claim 1 wherein the base pipe has a Standard Dimensional Ratio between 26 and 36.

6. The pipe of claim 1 wherein the pipe liner is of a continuous length produced in-situ at a site of a host pipe.

7. The pipe of claim 1 further comprising
   a plurality of sensors positioned on the base pipe that provide signals indicative of one of tension applied to the pipe, leaks of the pipe, movement of the pipe, and temperature along the pipe.

8. The pipe of claim 7, the pipe liner further comprising
   a third wrap to secure the axial strength members and sensors in place, and
   a fourth wrap to cover the third wrap.

9. The pipe of claim 1 wherein the first strengthening wrap and the second strengthening wrap are fabric material made of high strength synthetic fibers.

10. The pipe of claim 1 wherein the axial strength members are unidirectional tapes made of synthetic fibers.

11. The pipe of claim 1 wherein the protective outer wrap is one of adhesive backed thermoplastic tape, a sleeve of thermoplastic film, and a sleeve of HDPE film.

12. The pipe of claim 1 wherein the axial strength members are pulling tapes.

13. The pipe of claim 1 wherein the pipe and the pipe liner range in length up to 10 miles.

14. The pipe of claim 1 in which the base pipe has a Hazen-Williams coefficient between 150 and 160.

15. A method for making a pipe liner suitable for installation into a host pipe without the application of energy to the pipe liner before or after the installation, the method comprising welding together a plurality of pipe sections to form a base pipe, the base pipe comprising a new pipe, the base pipe comprising a temperature resistant non-metallic corrosion-resistant material made in-situ at a use site, the base pipe having an outer surface, an inner surface, a first end and a second end and a flow channel therethrough from the first end to the second end, the base pipe comprising a stand-alone replacement for use within a damaged host pipe, the base pipe having a wall thickness between about 4 mm and 7 mm, wrapping the base pipe with a first strengthening wrap, wrapping the base pipe with a second strengthening wrap, securing a plurality of axial strength members on the base pipe, deforming the base pipe to facilitate insertion thereof into a damaged host pipe, and wrapping the base pipe following deforming with a plurality of members to maintain the pipe in a deformed shape during insertion into a damaged host pipe.

16. The method of claim 15 wherein the welding is done by a fusion welding machine for butt fusion welding the pipe sections together end-to-end.

17. The method of claim 15 wherein each of the plurality of individual pipe sections is an extruded cylinder.

18. A pipe liner which is suitable for insertion into a host pipe, without the application of energy to the pipe liner before or after the insertion, the pipe liner comprising the pipe liner comprising a stand-alone continuous length high-pressure non-metallic liner produced in-situ at a site of a host pipe, the pipe liner comprising a plurality of individual pipe sections connected together, each section comprising an extruded cylinder, a base pipe comprising a plurality of pipe sections welded together, the pipe sections each being an extruded cyliner made of temperature-resistant non-metallic corrosion-resistant material, the base pipe comprising a new pipe, the base pipe having an outer surface, an inner surface, a first end and a second end and a flow channel therethrough from the first end to the second end, the base pipe having a wall thickness of at least 7 mm, the base pipe having a Standard Dimensional Ratio between 26 and 36, at least one strengthening wrap around the base pipe, a plurality of spaced-apart axial strength members positioned longitudinally on the base pipe, at least one fiber optic sensor on the base pipe for providing a signal indicative of one of tension applied to the pipe, leaks of the core pipe, movement of the pipe, and temperature along the pipe, a third wrap to secure the axial strength members and sensors in place, a fourth wrap on the third wrap, the pipe liner ranging in length up to 10 miles, and the pipe liner made in-situ at a location of the host pipe, the base pipe comprising a stand-alone replacement for use within a damaged host pipe.

19. The pipe liner of claim 18 wherein the plurality of individual pipe sections are welded together.

20. The pipe liner of claim 18 wherein the plurality of individual pipe sections are butt fusion welded together end-to-end using a fusion welding machine.

21. The pipe liner of claim 19 wherein weld beads produced during welding of the individual pipe sections are removed.

22. The pipe liner of claim 21 wherein weld beads are removed from an inside of the pipe.

23. The pipe liner of claim 18 further comprising a protective outer wrap on the base pipe for protection during installation of the pipe liner.

* * * * *